US011061482B2

(12) United States Patent
Madsen et al.

(10) Patent No.: US 11,061,482 B2
(45) Date of Patent: Jul. 13, 2021

(54) FORCE SENSITIVE INPUT DEVICES AND METHODS

(71) Applicant: Aimpad, LLC, Noblesville, IN (US)

(72) Inventors: Lance William Madsen, Lafayette, IN (US); Nikhil Bajaj, West Lafayette, IN (US)

(73) Assignee: Aimpad, LLC, Noblesville, IN (US)

( * ) Notice: Subject to any disclaimer, the term of this patent is extended or adjusted under 35 U.S.C. 154(b) by 0 days.

(21) Appl. No.: 16/732,999

(22) Filed: Jan. 2, 2020

(65) Prior Publication Data

US 2020/0218362 A1 Jul. 9, 2020

Related U.S. Application Data

(60) Provisional application No. 62/788,486, filed on Jan. 4, 2019.

(51) Int. Cl.
*G06F 3/02* (2006.01)
*A63F 13/218* (2014.01)

(52) U.S. Cl.
CPC .......... *G06F 3/0202* (2013.01); *A63F 13/218* (2014.09)

(58) Field of Classification Search
CPC .............................. G06F 3/0202; A63F 13/218
See application file for complete search history.

(56) References Cited

U.S. PATENT DOCUMENTS

| | | |
|---|---|---|
| 2,919,350 A | 12/1959 | Taylor et al. |
| 3,356,848 A | 12/1967 | Heyck |
| 4,130,941 A | 12/1978 | Amsbury |
| 4,311,990 A | 1/1982 | Burke |
| 4,534,668 A | 8/1985 | Hildel et al. |
| 4,541,059 A | 9/1985 | Toshihiko |
| 4,591,712 A | 5/1986 | Thalmann |
| 4,670,653 A | 6/1987 | McConkle et al. |
| 4,766,306 A | 8/1988 | Bichsel et al. |

(Continued)

FOREIGN PATENT DOCUMENTS

| | | |
|---|---|---|
| CN | 1051806 A | 5/1991 |
| CN | 1820302 A | 8/2006 |

(Continued)

OTHER PUBLICATIONS

Anonymous, "Calibration," dated Jul. 29, 2015, retrieved May 7, 2020, from https://www.arduino.cc/en/tutorial/calibration, 5 pages.

(Continued)

*Primary Examiner* — Michael Pervan
(74) *Attorney, Agent, or Firm* — Barnes & Thornburg LLP

(57) ABSTRACT

Force sensitive input device and methods are disclosed. A force sensitive input device may include a button, an analog sensor, and circuitry. The button may be movable along a first axis between first and second end positions and biased toward the first end position. The analog sensor may output an analog signal that is a function of a displacement of the button along the first axis from the first end position. The circuitry may generate both analog and digital input data in response to the analog signal. The analog input data may include a range of values that are monotonically related to the displacement of the button, and the digital input data may include first and second binary values.

32 Claims, 10 Drawing Sheets

(56) References Cited

U.S. PATENT DOCUMENTS

| | | |
|---|---|---|
| 4,812,635 A | 3/1989 | Kaufmann et al. |
| 4,836,636 A | 6/1989 | Obara et al. |
| 4,980,685 A | 12/1990 | Souloumiac et al. |
| 5,161,405 A | 11/1992 | Macqueene |
| 5,311,014 A | 5/1994 | Liucci |
| 5,355,148 A | 10/1994 | Anderson |
| 5,434,566 A | 7/1995 | Iwasa et al. |
| 5,499,041 A | 3/1996 | Brandenburg et al. |
| 5,699,059 A | 12/1997 | Hiller |
| 5,943,233 A | 8/1999 | Ebina et al. |
| 6,053,814 A | 4/2000 | Pchenitchnikov et al. |
| 6,195,082 B1 | 2/2001 | May et al. |
| 6,229,081 B1 | 5/2001 | Ura et al. |
| 6,426,600 B1 | 7/2002 | Lautzenhiser et al. |
| 6,507,433 B2 | 1/2003 | Mecham et al. |
| 6,612,160 B2 | 9/2003 | Massie et al. |
| 6,684,166 B2 | 1/2004 | Bellwood et al. |
| 6,697,501 B2 | 2/2004 | Tevs et al. |
| 6,749,506 B2 | 6/2004 | Komata |
| 6,875,977 B2 | 4/2005 | Wolter et al. |
| 7,116,430 B2 | 10/2006 | Degertekin et al. |
| 7,417,624 B2 | 8/2008 | Duff |
| 7,518,737 B2 | 4/2009 | Hall et al. |
| 7,528,824 B2 | 5/2009 | Kong |
| 8,102,554 B2 | 1/2012 | Silverbrook et al. |
| 8,242,388 B2 | 8/2012 | Song |
| 8,350,143 B2 | 1/2013 | Fujiwara et al. |
| 8,717,202 B1 | 5/2014 | Bajaj et al. |
| 8,922,399 B2 | 12/2014 | Bajaj et al. |
| 2001/0007449 A1 | 7/2001 | Kobachi et al. |
| 2003/0052257 A1 | 3/2003 | Sumriddetchkajorn |
| 2003/0102422 A1 | 6/2003 | Gombert |
| 2007/0293318 A1 | 12/2007 | Tetterington et al. |
| 2008/0088591 A1 | 4/2008 | Joo et al. |
| 2008/0096657 A1 | 4/2008 | Benoist |
| 2009/0032313 A1 | 2/2009 | Silverbrook et al. |
| 2009/0046065 A1 | 2/2009 | Liu et al. |
| 2009/0115723 A1 | 5/2009 | Henty |
| 2010/0062583 A1 | 3/2010 | Hanaoka et al. |
| 2010/0148999 A1 | 6/2010 | Casparian et al. |
| 2010/0286947 A1 | 11/2010 | Chiang et al. |
| 2010/0321670 A1 | 12/2010 | Kuo |
| 2011/0025606 A1 | 2/2011 | Chvojcsek et al. |
| 2011/0234501 A1 | 9/2011 | Hosoda |
| 2011/0269543 A1 | 11/2011 | Johnson |
| 2014/0005682 A1 | 1/2014 | Worrell et al. |
| 2014/0267053 A1* | 9/2014 | Bajaj ............... G06F 3/016 345/168 |

FOREIGN PATENT DOCUMENTS

| | | |
|---|---|---|
| CN | 101968389 A | 2/2011 |
| CN | 102314237 A | 1/2012 |
| EP | 0518648 A2 | 12/1992 |
| EP | 2330495 A2 | 6/2011 |
| JP | 5303466 A | 11/1993 |
| JP | 3408357 B2 | 1/1997 |
| JP | 3966964 B2 | 8/2007 |
| WO | 2005055028 A2 | 6/2005 |

OTHER PUBLICATIONS

EPO, Extended European Search Report for related EP 20150377.8, dated May 26, 2020, 8 pages.
McPherson et al., "Augmenting the Acoustic Piano with Electromagnetic String Actuation and Continuous Key Position Sensing", Proceedings of the 2010 Conference on New Interfaces for Musical Expression, Jun. 2010, pp. 217-222.
Cherry Corp., "Keymodule MX", Dec. 7, 2006, pp. 62-63.
Fairchild Semiconductor Corp., "QRE1113, QRE1113GR Miniature Reflective Object Sensor", Aug. 2011, pp. 1-8.
Amtel Corp., "8-Bit AVR Microcontroller with 16/32K Bytes of ISP Flash and USB Controller", 2010, pp. 1-26.
Heckendorn, "XBOX Controller Mods: Analog WASD Gaming Keyboard", available at http://www.youtube.com/watch?v+gEw+DlmE0Du4, Nov. 25, 2012 (screenshot).
ISA/RU, Interantional Search Report and Written Opinion for PCT/US2014/016701, dated Aug. 5, 2014, 7 pages.
European Patent Office, Communication pursuant to Article 94(3) EPC, for related EP20150377.8, dated Mar. 11, 2021, 5 pages.

* cited by examiner

FORCE SENSITIVE INPUT DEVICES AND METHODS

CROSS-REFERENCE TO RELATED APPLICATION

This application claims the benefit of U.S. Provisional Patent Application Ser. No. 62/788,486, filed Jan. 4, 2019, the entire disclosure of which is incorporated by reference herein. This application is also related to U.S. Pat. Nos. 8,717,202 and 8,922,399, the entire disclosures of which are incorporated by reference herein.

TECHNICAL FIELD

The present disclosure relates, generally, to input devices and methods and, more particularly, to force sensitive input devices and methods.

BACKGROUND

One common input device used in interfacing with a computing device is the digital switch or button. Digital switches typically include a physical electrical contact designed to present a low electrical resistance when the switch is activated and an open circuit when the switch is not activated. Such switches generally have a binary output (e.g., on or off, high or low). Many types of physical mechanisms, with different behaviors, may be used for digital switches. For example, rocker switches, toggle switches, tactile switches, and sliding switches are all examples of switches that take discrete on or off values. Some digital switches can represent more than two values (e.g., via multiple positions) by connecting some combination of three or more contacts. However, all of these switches have the significant limitation of only being able to take a discrete number of positions and, thus, only being able to represent a limited set of possible user intents.

Analog sensors may also be used in interfacing with a computing device to achieve more granularity along a continuum of user intent. As analog sensors typically measure a physical behavior or phenomenon that can vary continuously under the control of the user, they generally have a continuous range of output values. One example of an analog sensor is a potentiometer (i.e., variable resistor) coupled to a slider or knob that is manipulated by a user. The user may adjust the slider or knob to set the resistance of the potentiometer along a continuum of values, and this resistance may be measured by an appropriate circuit. Prior analog sensors, such as those based on variable resistors, have suffered from poor response time due to the measurement methods used and/or the relaxation time required by the materials utilized. Prior analog sensors have also provided poor tactile, or haptic, response that does not feed back the performance of the sensor to the user or provide reassurance that the input would be what the user expected.

When used in an input device, a sensor must fit into the form factor needed for the particular application. One common form factor used for interfacing with a computing device is the keyswitch (or "key"), which has been used in personal computer keyboards, gaming controllers, control panels of computer-numerically controlled (CNC) industrial equipment (e.g., lathes, saws, milling machines, and the like), and other computing devices. The key typically includes a resilient component (e.g., a metal coil spring, a rubber dome, etc.) that returns a keycap to a home state when a user is not interacting with the key. For many analog sensors, the incorporation of the additional circuitry used to measure the subject physical behavior or phenomenon into the form factor of a standard key is impractical. For instance, in an analog sensor utilizing a potentiometer (as described above), the potentiometer may not fit within the form factor of a standard key.

Gaming controllers used as input devices are often used to control the movement and/or actions of a character in an electronic game (e.g., a computer game). Gaming controllers typically include a number of digital switches or buttons. As described above, the digital buttons of such gaming controllers typically have a binary output that results in a character either moving at a constant speed or not moving at all. While controlling a character using four digital buttons (e.g., up, down, left, and right buttons) may result in a precise direction of movement, the magnitude or speed of movement is fixed. Some gaming controllers also include an analog joystick to allow more granular control of character movement and/or actions. Typically, analog sensors in the gaming controller determine how far the joystick is displaced from a center position along both an x-axis and a y-axis (simultaneously). Thus, in contrast to digital buttons, an analog joystick is able to control character movement in any direction (i.e., 360 degrees) and at different magnitudes (based on how far the joystick is moved from the center position). Unlike digital buttons, however, a user is not able to precisely control the direction of character movement (e.g., at exactly 90 degrees) with an analog joystick.

SUMMARY

According to one aspect of the present disclosure, a force sensitive input device may comprise a button, an analog sensor, and circuitry. The button may be movable along a first axis between first and second end positions and biased toward the first end position. The analog sensor may output an analog signal that is a function of a displacement of the button along the first axis from the first end position. The circuitry may generate both analog and digital input data in response to the analog signal. The analog input data may include a range of values that are monotonically related to the displacement of the button, and the digital input data may include first and second binary values.

In some embodiments, the circuitry may output both the analog and digital input data, only the analog input data, or only the digital input data.

In at least one embodiment, the first binary value may be representative of the displacement of the button being less than a threshold displacement, and the threshold displacement may correspond to a threshold position located between the first and second end positions. The second binary value may be representative of the displacement of the button being equal to or greater than the threshold displacement.

In some embodiments, a minimum value of the analog input data may be representative of the button being in the first end position, and a maximum value of the analog input data may be representative of the button being in the second end position.

In some embodiments, a minimum value of the analog input data may be representative of the button being in the first end position, and a maximum value of the analog input data may be representative of the button being in the threshold position.

In at least one embodiment, the threshold displacement is reconfigurable to any selected displacement of the button.

In some embodiments, the threshold position may be closer to the second end position than the first end position.

According to another aspect of the present disclosure, a method of using a force sensitive input device may comprise outputting, using an analog sensor, an analog signal that is a function of a displacement of the button along the first axis from the first end position. The method may further comprise generating both analog and digital input data in response to the analog signal. The analog input data may include a range of values that are monotonically related to the displacement of the button, and the digital input data may include first and second binary values. The force sensitive input device may comprise a button movable along a first axis between first and second end positions and biased toward the first end position.

In some embodiments, the method may further comprise configuring the force sensitive input device to output one of (i) both the analog and digital input data, (ii) only the analog input data, or (iii) only the digital input data.

In at least one embodiment, the first binary value may be representative of the displacement of the button being less than a threshold displacement, and the threshold displacement may correspond to a threshold position located between the first and second end positions. The second binary value may be representative of the displacement of the button being equal to or greater than the threshold displacement.

In some embodiments, a minimum value of the analog input data may be representative of the button being in the first end position, and a maximum value of the analog input data may be representative of the button being in the second end position.

In at least one embodiment, a minimum value of the analog input data may be representative of the button being in the first end position, and a maximum value of the analog input data may be representative of the button being in the threshold position.

In some embodiments, the threshold position may be closer to the second end position than the first end position.

In at least one embodiment, the method may further comprise adjusting the threshold displacement based upon a user setting.

According to yet another aspect of the present disclosure, a force sensitive input device may comprise a button, an analog sensor, and circuitry. The button may be movable along a first axis between first and second end positions and biased toward the first end position. The analog sensor may output an analog signal that is a function of a displacement of the button along the first axis from the first end position. The circuitry may generate input data in response to the analog signal using stored calibration data that associates values of the analog signal with positions of the button along the first axis. The circuitry may also perform an automatic calibration procedure that comprises updating the stored calibration data with at least one sampled value of the analog signal.

In some embodiments, the automatic calibration procedure may comprise, when a sampled value of the analog signal is greater than a stored value associated with the second end position in the stored calibration data, updating the stored calibration data by replacing the stored value associated with the second end position with the sampled value.

In at least one embodiment, the automatic calibration procedure may comprise, when a sampled value of the analog signal is less than a stored value associated with the first end position in the stored calibration data, updating the stored calibration data by replacing the stored value associated with the first end position with the sampled value.

In some embodiments, the automatic calibration procedure may comprise repeatedly sampling the analog signal during a first calibration time period and updating the stored calibration data by replacing a stored value associated with the second end position in the stored calibration data with a highest value of the analog signal sampled during the first calibration time period.

In at least one embodiment, the first calibration time period may be a time period during which a mechanical switch of the button is activated.

In some embodiments, the automatic calibration procedure may comprise repeatedly sampling the analog signal during a second calibration time period, and updating the stored calibration data by replacing a stored value associated with the first end position in the stored calibration data with a lowest value of the analog signal sampled during the second calibration time period.

In at least one embodiment, the second calibration time period may be a time period during which a mechanical switch of the button is not activated.

According to still another aspect of the present disclosure, a method of using a force sensitive input device may comprise outputting, using an analog sensor, an analog signal that is a function of a displacement of the button along the first axis from the first end position. The method may further comprise generating input data in response to sampled values of the analog signal using stored calibration data that associates values of the analog signal with positions of the button along the first axis. The method may further comprise automatically calibrating the force sensitive input device. The automatically calibrating may comprise updating the stored calibration data with at least one sampled value of the analog signal. The force sensitive input device may comprise a button movable along a first axis between first and second end positions and biased toward the first end position In some embodiments, the automatically calibrating may comprise, when a sampled value of the analog signal is greater than a stored value associated with the second end position in the stored calibration data, updating the stored calibration data by replacing the stored value associated with the second end position with the sampled value.

In at least one embodiment, the automatically calibrating may comprise, when a sampled value of the analog signal is less than a stored value associated with the first end position in the stored calibration data, updating the stored calibration data by replacing the stored value associated with the first end position with the sampled value.

In some embodiments, the automatically calibrating may comprise repeatedly sampling the analog signal during a calibration time period during which a mechanical switch of the button is activated. The automatically calibrating may further comprise updating the stored calibration data by replacing a stored value associated with the second end position in the stored calibration data with a highest value of the analog signal sampled during the calibration time period.

In at least one embodiment, the automatically calibrating may comprise repeatedly sampling the analog signal during a calibration time period during which a mechanical switch of the button is not activated. The automatically calibrating may further comprise updating the stored calibration data by replacing a stored value associated with the first end position in the stored calibration data with a lowest value of the analog signal sampled during the calibration time period.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, the same reference labels or similar reference labels (e.g., reference labels ending in the same two digits) have been repeated among the figures to indicate corresponding or analogous elements. The detailed description particularly refers to the accompanying figures in which.

DETAILED DESCRIPTION OF THE DRAWINGS

Figure 1:
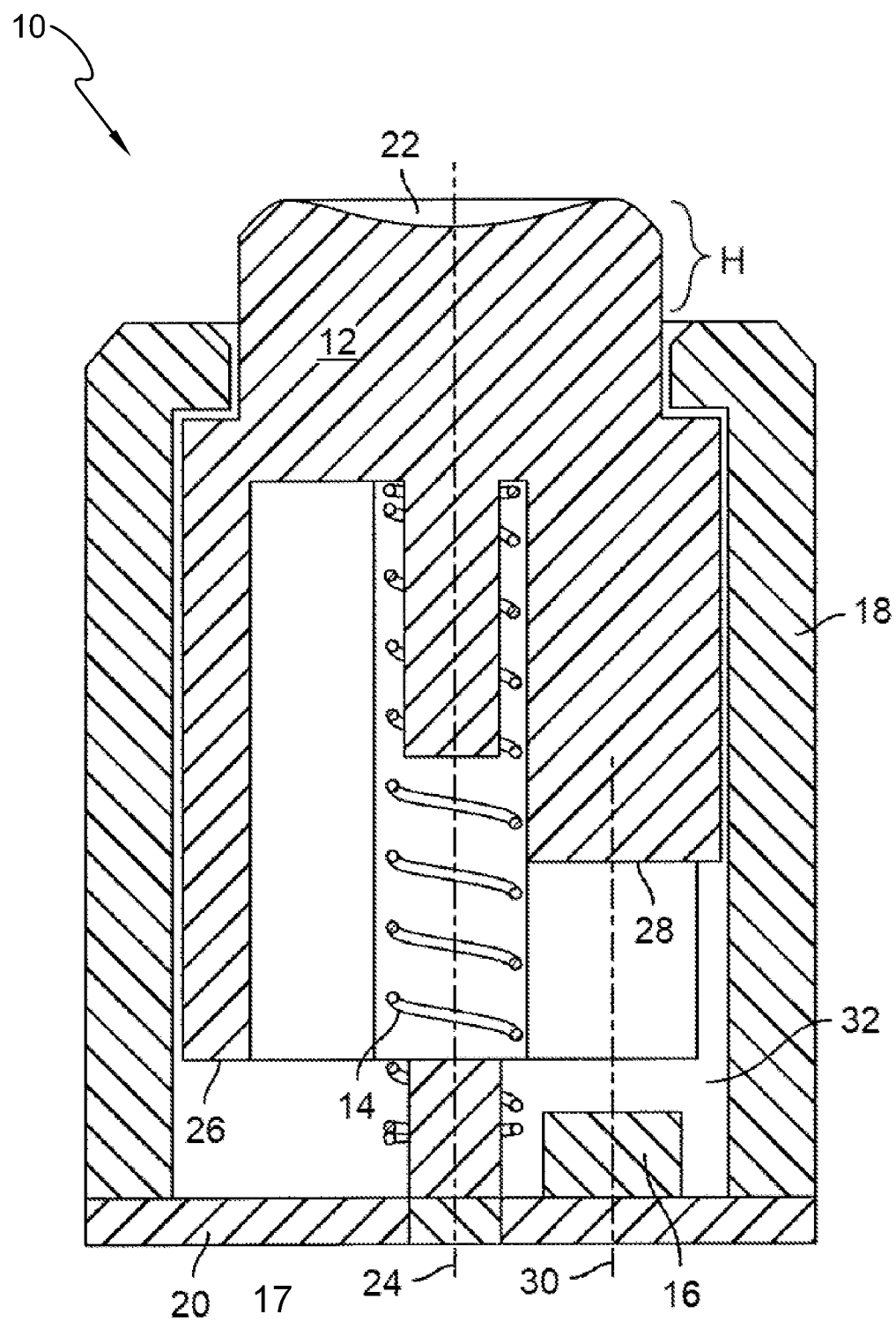
FIG. 1 is a cross-sectional view of one illustrative embodiment of a force sensitive input device.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but, on the contrary, the intention is to cover all modifications, equivalents, and alternatives falling within the spirit and scope of the invention as defined by the appended claims.

In the following description, numerous specific details, such as types and interrelationships of circuit components, are set forth in order to provide a more thorough understanding of the present disclosure. It will be appreciated, however, by one skilled in the art that embodiments of the disclosure may be practiced without such specific details. In other instances, various circuit components have not been shown in detail (or not labeled in every instance) in order to not obscure the invention. Those of ordinary skill in the art, with the included descriptions, will be able to implement appropriate functionality without undue experimentation.

References in the specification to "one embodiment," "an embodiment," "an illustrative embodiment," etcetera, indicate that at least one embodiment described may include a particular feature, structure, or characteristic, but not every embodiment necessarily includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Referring to FIGS. 1-10, various embodiments of a combined analog/digital input key 10 are shown. The combined analog/digital input key 10 in each of FIGS. 1-10 is shown without a keycap 134 that is normally coupled to plunger 12, 136 and depressed by a user to activate the key 10. When the keycap 134 is depressed by a user, the plunger 12 is able to travel downward over a distance H. A resilient component 14, which may be a spring, elastic member, or the like, positioned inside the housing 18 biases the plunger 12 toward its uppermost position, which is illustrated in FIGS. 1-7. In other embodiments, the resilient component 14 might bias the plunger 12 towards a lowermost position.

In the illustrative embodiment, the combined analog/digital input key 10 utilizes an analog sensor 16 (e.g., a reflectance sensor, capacitive sensor, or the like) to obtain analog measurements of the movement of the plunger 12 along its axis of travel (over the distance H). The signal output by the analog sensor 16 is a function of how far the plunger 12 has moved along the distance H (i.e., how far a user has depressed the key). Circuitry 17 associated with the input key 10 may receive the analog sensor signal and correlate its value to a distance traveled by the plunger 12, which may be expressed as a percentage of the distance H. The circuitry 17 may then generate analog input data and digital input data that may be outputted to a separate circuitry assembly, such as driver software of computer hardware.

Referring now to FIG. 1, one illustrative embodiment of a force sensitive input key 10 is shown in cross-section. In at least one embodiment, the input key 10 may generally include a plunger 12, a resilient component 14, an analog sensor 16, and a housing 18. In some embodiments, such as that shown in FIG. 1, a bottom side of the housing 18 may be open, allowing the input key 10 to be secured to a support surface, such as a printed circuit board (PCB) 20. It is contemplated that, in other embodiments, the input key 10 may contain additional or different components to those illustrated in FIG. 1. As used herein, the term "plunger" may also refer to a "button" of a force sensitive input key, and the phrase "force sensitive input key" may also refer to a "force sensitive input device."

The plunger 12 of the input key 10 includes a surface 22 that is exposed through the housing 18 and is designed to be pressed by a user or attached to a keycap 134, as will be discussed in greater detail below. The plunger 12 is movable relative to the housing 18 along an axis 24 between two end positions. The plunger 12 is illustrated in FIG. 1 in a top end position. When the surface 22 of the button is pressed by a user, the plunger 12 may move along the axis 24 (downward in FIG. 1) until the plunger 12 reaches a bottom end position. In the illustrative embodiment, a bottom surface 26 of the plunger 12 will be proximate to the PCB 20 when the plunger 12 is in the bottom end position. As the plunger 12 is an analog mechanism, the plunger 12 is positionable at an infinite number of positions between the top and bottom end positions.

In some embodiments, in particular those in which the analog sensor 16 includes a reflectance sensor, the plunger 12 may include a reflective surface 28 that partially or fully reflects some or all types of light. In the illustrative embodiment, the reflective surface 28 reflects light towards the analog sensor 16 such that the analog sensor 16 outputs an analog signal that is a function of the force applied to the plunger 12 and/or the displacement of the plunger 12 along the first axis 24. It is contemplated that, in other embodiments in which the analog sensor 16 includes a sensor or sensors other than a reflectance sensor, the analog signal outputted by the analog sensor 16 is still a function of the force applied to the plunger 12 and/or the displacement of the plunger 12 along the first axis.

In the illustrative embodiment, the reflective surface 28 of the plunger 12 may reflect light of a particular wavelength or spectrum of wavelengths. In the illustrative embodiment, the reflective surface 28 is a surface of the plunger 12 (i.e., the reflective surface 28 is integrally formed with the plunger 12). In other embodiments, the reflective surface 28 may be coupled to the plunger 12 after the plunger 12 has been formed. By way of example, the reflective surface 28 may be applied to a surface of the plunger 12 as a reflective coating.

The resilient component 14 of the input key 10 biases the plunger 12 toward the top end position. As shown in FIG. 1, the resilient component 14 is illustratively embodied as a metal coil spring 14. One end of the spring 14 is engaged with the plunger 12, while the other end of the spring 14 is engaged with the PCB 20. In the illustrative embodiment of FIG. 1, the spring 14 has a generally cylindrical shape, and the plunger 12 and the PCB 20 each include a cylindrical feature that is received within one end of the spring 14 to maintain engagement with the spring 14. The resilient nature of the spring 14 allows the plunger 12 to move along the axis 24 when a force is applied to the plunger 12 by a user, but causes the plunger 12 to return to the top end position, shown in FIG. 1, when the force is no longer applied by the user. This configuration of the plunger 12 and the spring 14 provides haptic feedback that allows a user to feel the amount of input (i.e., force) that the user is applying to the plunger 12. Furthermore, the spring 14 may be designed with a fast, robust response that requires very little relaxation time. It will be appreciated that, in other embodiments, the resilient component 14 may be any type of component that allows movement of the plunger 12 along the axis 24, but biases the plunger 12 toward the top end position (e.g., a rubber dome).

In at least one embodiment, in particular those in which the analog sensor 16 includes a reflectance sensor, the analog sensor 16 of the input key 10 is configured to emit light that impinges upon the reflective surface 28. An amount of the light that impinges upon the reflective surface 28 will be reflected back toward the analog sensor 16 and will be measured by the analog sensor 16. As shown in FIG. 1, the light emitted from the analog sensor 16 that is reflected by the reflective surface 28 and then returns to the analog sensor 16 generally travels along an axis 30 that is parallel to the axis 24. In the illustrative embodiment, the reflective surface 28 is generally perpendicular to the axis 30. As the plunger 12 moves along the axis 24 (e.g., when a force is applied to the plunger 12 by a user), the reflective surface 28 of the plunger 12 will move along the axis 30.

As the distance between the analog sensor 16 and the reflective surface 28 of the plunger 12 changes, the amount of light that is reflected from the reflective surface 28 back to the analog sensor 16 will also change (for instance, when the reflective surface 28 and the analog sensor 16 are farther apart, more scattering will occur and less light will return to the analog sensor 16). In particular, the amount of light that is reflected from the reflective surface 28 is monotonically related to the displacement of the plunger 12 from the top end position (i.e., the distance the plunger 12 travels along the axis 24, which is also the distance the reflective surface 28 travels along the axis 30). As such, by measuring the amount of light that is reflected from the reflective surface 28, the analog sensor 16 is able to indirectly measure the distance between the analog sensor 16 and the reflective surface 28 of the plunger 12.

The measurement by the analog sensor 16 of the amount of light that is reflected from the reflective surface 28 is related not only to the distance between the analog sensor 16 and the reflective surface 28 but also, as a result of the spring 14, to the force applied to the plunger 12 by a user. The particular properties of the spring 14 (or other resilient component 14) used in the input key 10 will result in a particular relationship between the amount of force applied to the plunger 12 and the displacement of the plunger 12 allowed by the spring 14. In the illustrative embodiment, the spring 14 is configured to allow a displacement of the plunger 12 from the top end position that is proportional to the force applied to the plunger 12. As the displacement of the plunger 12 is proportional to the force applied, and the amount of light reflected from the reflective surface 28 is monotonically related to the displacement of the plunger 12, the amount of the light that is reflected from the reflective surface 28 is also monotonically related to the force applied to the plunger 12. As such, by measuring the amount of light that is reflected from the reflective surface 28, the analog sensor 16 is also able to indirectly measure a force applied to the plunger 12 by a user.

In the illustrative embodiment, the analog sensor 16 includes a light-emitting diode (LED) configured to emit the light and a phototransistor configured to receive and measure the amount of the light that is reflected from the reflective surface 28. In particular, the analog sensor 16 is illustratively embodied as a QRE1113 Miniature Reflective Object Sensor, commercially available from Fairchild Semiconductor Corporation of San Jose, Calif. As shown in FIG. 1, the analog sensor 16 may be soldered to the PCB 20 with the LED and the phototransistor facing the reflective surface 28. When energized, the LED of the analog sensor 16 emits infrared light toward the reflective surface 28. Infrared light returning from the reflective surface 28 to the analog sensor 16 impinges upon the phototransistor. In the illustrative embodiment, the phototransistor of the analog sensor 16 is a bipolar junction transistor (BJT) with a light sensitive base.

As such, the phototransistor will output an analog signal (e.g., of varying voltage) that is a function of the amount of the light that is reflected from the reflective surface 28 back to the analog sensor 16. This analog signal may be processed to determine a force applied to the plunger 12 as well as a displacement of the plunger 12, as further described below. It is contemplated that, in other embodiments, the analog sensor 16 may have other configurations that include different light sources, light sensors, and/or different types of sensors.

The housing 18 may have any suitable shape for supporting the components of the input key 10. In the illustrative embodiment, the housing 18 defines a chamber 32 in an interior portion of the housing 18. As shown in FIG. 1, the analog sensor 16 is disposed in the chamber 32. A portion of the plunger 12 is also disposed in the chamber 32. In particular, the reflective surface 28 of the plunger 12 is disposed in the chamber 32. In the illustrative embodiment, the housing 18 is formed of an opaque material, such that the light emitted by the analog sensor 16 does not pass through the housing 18. The opaque housing 18 also prevents outside light from impinging upon and being measured by the analog sensor 16.

In the illustrative embodiment, the input key 10 may function in an analog mode, a digital mode, and a combined analog/digital mode. In both the analog mode and the digital mode, the circuitry 17 associated with the input key 10 may receive the analog sensor signal and correlate its value to a distance traveled by the plunger 12, which, in some embodiments, may be expressed as a percentage of the distance H. In the analog mode, after receiving the analog sensor signal, the circuitry 17 may then generate analog input data (i.e., data representing an analog input) that may be outputted by the circuitry 17. In the digital mode, after receiving the analog sensor signal, the circuitry 17 may then generate digital input data (i.e., data representing a digital input) that may be outputted by the circuitry 17. In the combined analog/digital mode, the circuitry 17 may generate (and output) both the analog input data and the digital input data in response to the analog sensor signal.

Figure 2:
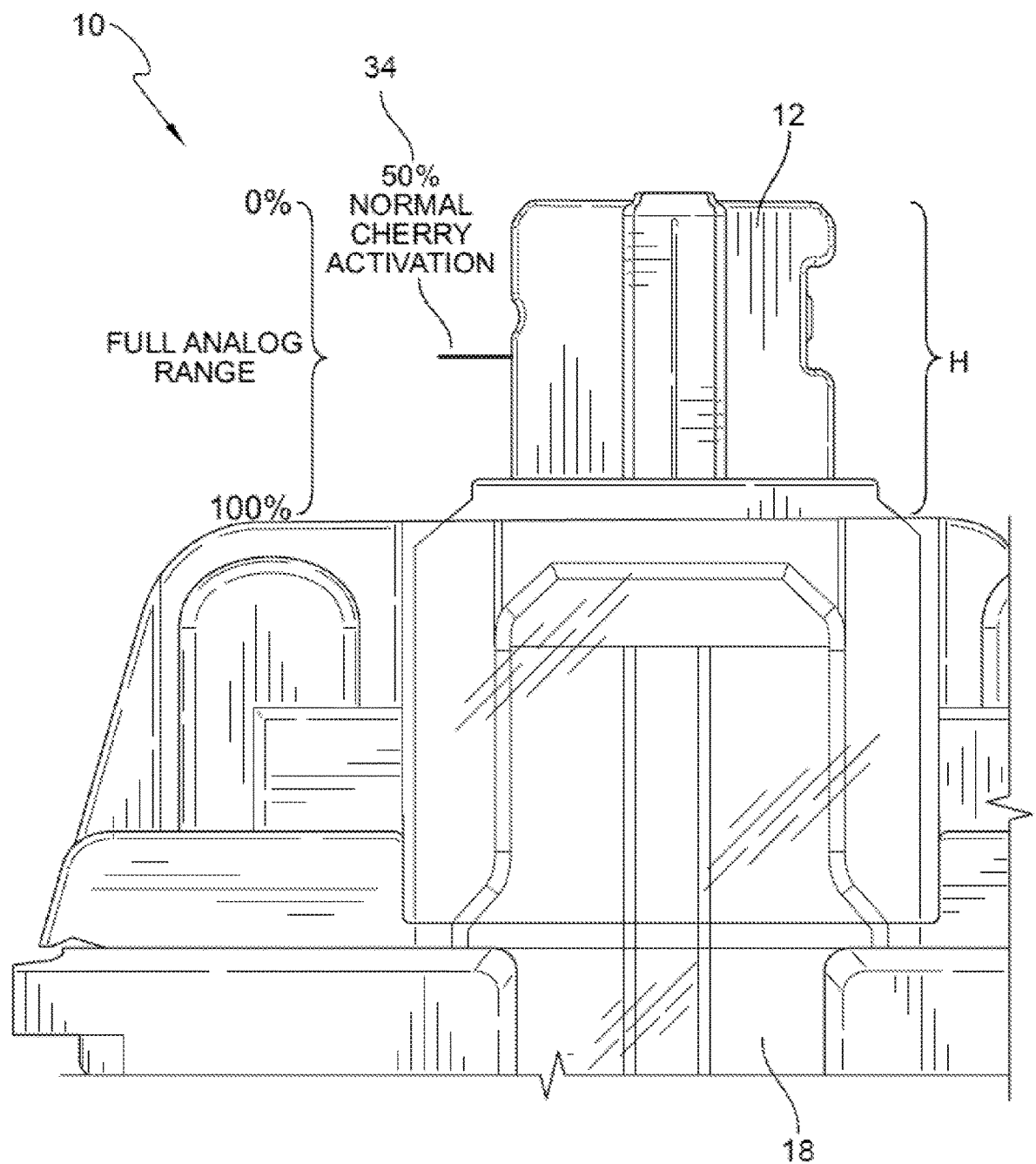
FIG. 2 is a diagram of one embodiment of a combined analog/digital input key (with its keycap removed), illustrating a first digital activation point along the keystroke and a first analog input range along the keystroke.
Figure 3:
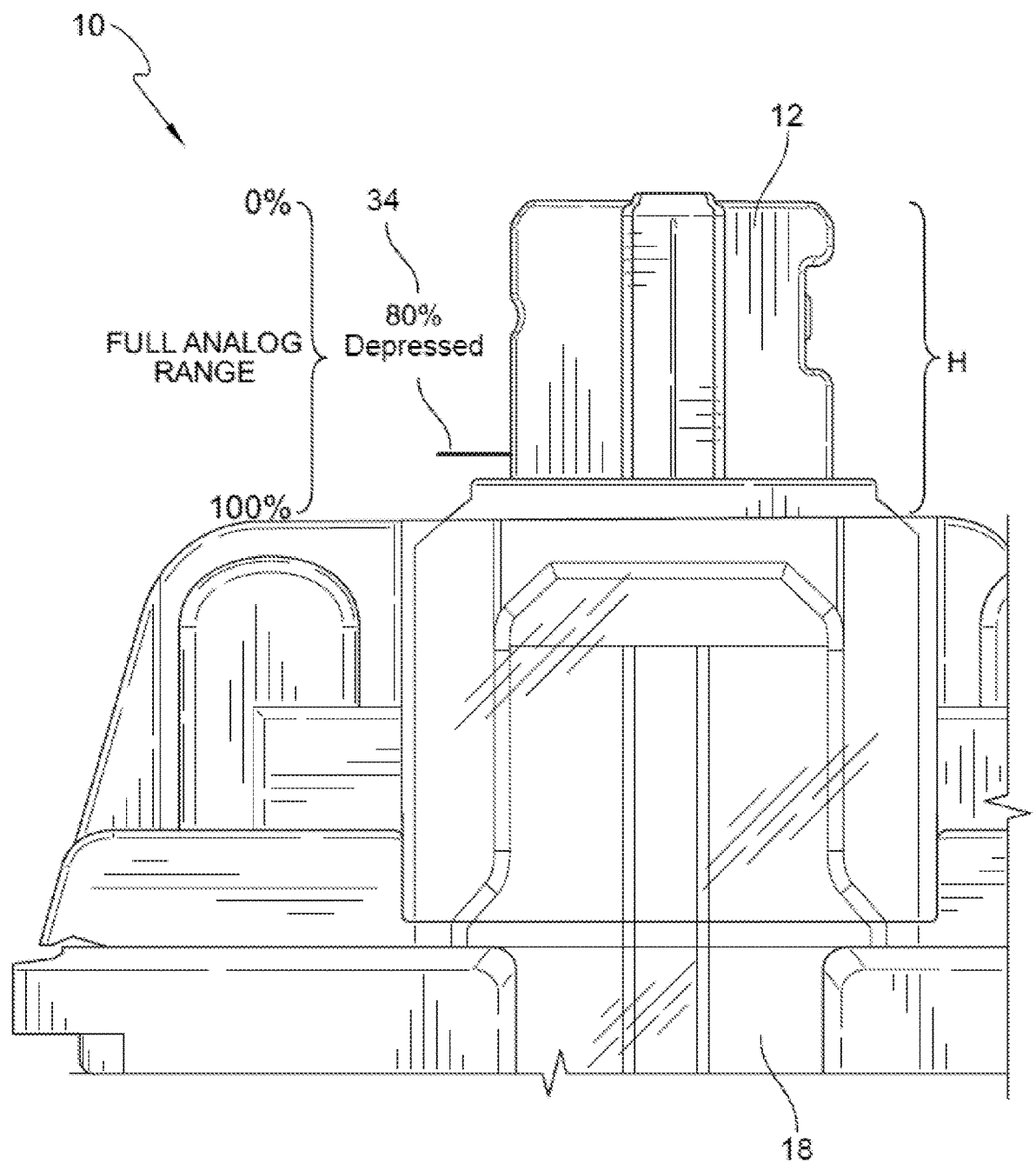
FIG. 3 is a diagram of another embodiment of a combined analog/digital input key (with its keycap removed), illustrating a second digital activation point along the keystroke and the first analog input range along the keystroke.
Figure 4:
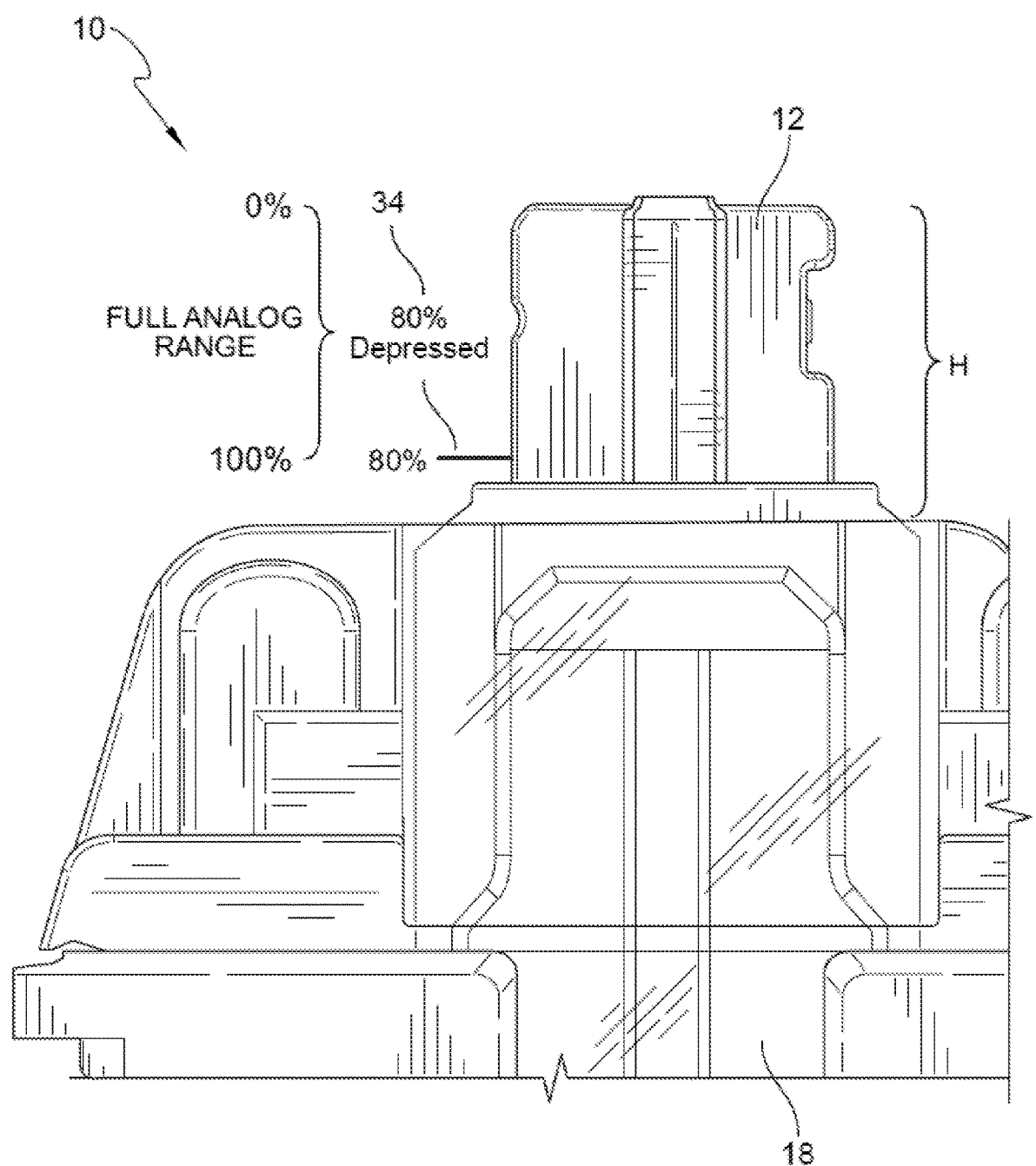
FIG. 4 is a diagram of yet another embodiment of a combined analog/digital input key (with its keycap removed), illustrating the second digital activation point along the keystroke and a second analog input range along the keystroke.

In at least one embodiment, the plunger 12, the resilient component 14, and the housing 18 of each combined analog/digital input key 10 are illustratively embodied as an MX Series Desktop Profile 0.60 Inch Keyswitch, commercially available from Cherry Corporation of Pleasant Prairie, Wis., as shown in FIGS. 2-4. In this illustrative embodiment, the distance H is about 4 millimeters, although other sized input keys 10 with varying possible depression distances of the plunger 12.

In the illustrative embodiment, in the analog mode, the analog input data generated by the circuitry 17 associated with the input key 10 may take on a range of values representative of the distance the plunger 12 has been displaced from its uppermost rest position. For instance, in one embodiment, the analog input data may be an integer ranging from 0 to 100 (i.e., 1, 2, 3, . . . , 98, 99, 100), where the integer represents a percentage of the distance H traveled by the plunger 12. In other embodiments, the analog input data may be a decimal number representative of the percentage of the distance H traveled by the plunger 12. In such an embodiment, a minimum value of the analog input data is representative of the plunger 12 is in a starting position and has not been pressed by a user. A maximum value of the analog input data is representative of the plunger 12 being fully depressed by a user. It is contemplated that in other embodiments that utilize other types of sensors, the minimum and maximum values of the analog input data may be representative of other positions of the plunger 12.

In the digital mode, the digital input data generated by the circuitry 17 associated with the input key 10 takes on a binary value (e.g., high or low, 0 or 1) that is representative of whether the plunger 12 has depressed at least a threshold distance 34 or not. For instance, in some embodiments, the threshold distance 34 may be set to 50% of the distance H (e.g., may be set at 2 mm in the illustrative embodiment). In such an embodiment, when the plunger 12 has not been depressed or has only been depressed less than 50% of the distance H, the circuitry 17 associated with the input key 10 will output a first binary value (e.g., a digital low or "0") when in digital mode. In this embodiment, once the plunger 12 has been depressed at least 50% (i.e., between 50-100%) of the distance H, the circuitry 17 associated with the input key 10 will output a second binary value (e.g., a digital high or "1") when in digital mode. It is contemplated that in other embodiments that utilize other types of sensors, the values of the digital input data may be representative of other positions of the plunger 12.

In some embodiments, a user may be able to toggle the functionality of the input key 10 between the analog and digital modes (e.g., by pressing another key or combination of other keys on a keyboard including the input key 10). However, toggling the functionality of the input key 10 in this manner is not always convenient or intuitive to a user. For example, it may be inconvenient for a user to switch between the analog mode and the digital mode during participation in an electronic computer game controlled by the keyboard, as the user's hands are typically required to remain on a specific combination of keys of the keyboard throughout the game. In particular, in many such electronic computer games, rapid events within the game require the user to keep his or her four left fingers on the W, S, A, and D keys during most of the game.

Accordingly, the input key 10 is also able to function in a combined analog/digital mode in which the circuitry 17 associated with the input key 10 simultaneously provides both of the outputs described above (i.e., the analog input data and the digital input data) to software or firmware associated with the input key including the input key 10. Presentation of both the analog input data and the digital input data in this manner may be problematic for control of certain software, at least if the threshold distance 34 for the digital input data is maintained at 50% as illustrated in FIG. 2.

To address this issue, in some embodiments, the threshold distance 34 for activation of a digital key press may be adjusted to value higher or lower than 50%. For instance, as shown in FIG. 3, the threshold distance 34 for the digital input data of the input key 10 may be set to 80%. It will be appreciated that, in other embodiments, the threshold distance 34 may be set to other values, such as any other value between 50-100%. It is also contemplated that the threshold distance 34 could be set to values between 0-50%. In some embodiments, the threshold distance 34 may be user configurable, such that it can be adjusted to any selected displacement of the plunger 12, allowing the user to reconfigure the input key 10 for different applications. For example, external software or a separate key on a keyboard may be utilized to manually set the threshold distance 34 of the plunger 12.

In the embodiment using 80% of the distance H as the threshold distance 34, when the plunger 12 has not been depressed or has only been depressed less than 80% of the distance H, the circuitry 17 associated with the input key 10 will output a "0" as the digital input data. In this embodiment, once the plunger 12 has been depressed at least 80% (i.e., between 80-100%) of the distance H, the circuitry 17 will output a "1" as the digital input data. This allows a greater portion of the distance H to be used for analog control, while still retaining the digital functionality of the input key 10.

In another embodiment, illustrated in FIG. 4, the analog signal of the input key 10 may be scaled to the portion of the distance H above the threshold distance 34 used for digital activation. This embodiment has the advantage of allowing the user to perform full analog control from 0-100% (at the expense of not using the full distance H of the keystroke for that analog control). As noted above, the threshold distance 34 used for digital activation may be set to any value between 51-100% and is illustratively set to 80% in the embodiment of FIG. 4. The threshold distance 34 may also be set to values between 0-50%. In the illustrative embodiment, movement of the plunger 12 through the initial 80% of the distance H correlates to an analog output ranging from 0-100%, while depression of the plunger to a position anywhere in the final 20% of the distance H activates the digital output. In such an embodiment, a minimum value of the analog input data is representative of the plunger 12 is in a starting position and has not been pressed by a user. As also illustrated in this embodiment, a maximum value of the analog input data is representative of the plunger 12 reaching the 80% threshold distance 34. It is contemplated that in other embodiments that utilize other types of sensors, the values of the analog input data may be representative of other positions of the plunger 12.

Table 1 below includes one illustrative embodiment of code for calculating the analog output from the analog sensor signal, where the range of the analog output is scaled to cover only a portion of the distance H (from the no displacement to the threshold distance 34 (the *magicpoint* in Table 1)).

TABLE 1

```
t_value =(float)adc_analog_min[Analog_W] +
    (adc_analog_max[Analog_W] –
    adc_analog_min[Analog_W])*magicpoint*.01;
f_value =(float)32767/(adc_analog_max[Analog_W] – t_value);
f_value =(float)(adc_analog_raw[Analog_W] –
t_value)*f_value;
if (f_value < 0)
    {
        f_value = 0;
    }
adc_analog_kb[Analog_W] = (uint16_t)f_value;
```

Table 2 below includes one illustrative embodiment of code for controlling the digital output to register a keystroke ("1") when the analog sensor signal indicates that the plunger 12 has reached (or exceeded) the threshold distance 34 and to return to "0" once the analog sensor signal indicates that the plunger 12 is above the threshold distance 34.

TABLE 2

```
if(adc_analog_kb[Analog_W] <= 1)
{
    if (adc_analog_key[Analog_W]==0)
    {
    //make W key down
    matrix_last[2][2] = 1;
    matrix_change[2][2] = 1;
    adc_analog_key[Analog_W] = 1;
    }
}
if(adc_analog_kb[Analog_W] > 1)
{
    if (adc_analog_key[Analog_W]==1)
    {
        //make W key up
        matrix_last[2][2] = 0;
        matrix_change[2][2] = 1;
        adc_analog_key[Analog_W     ] = 0;
    }
}
```

Figure 5:
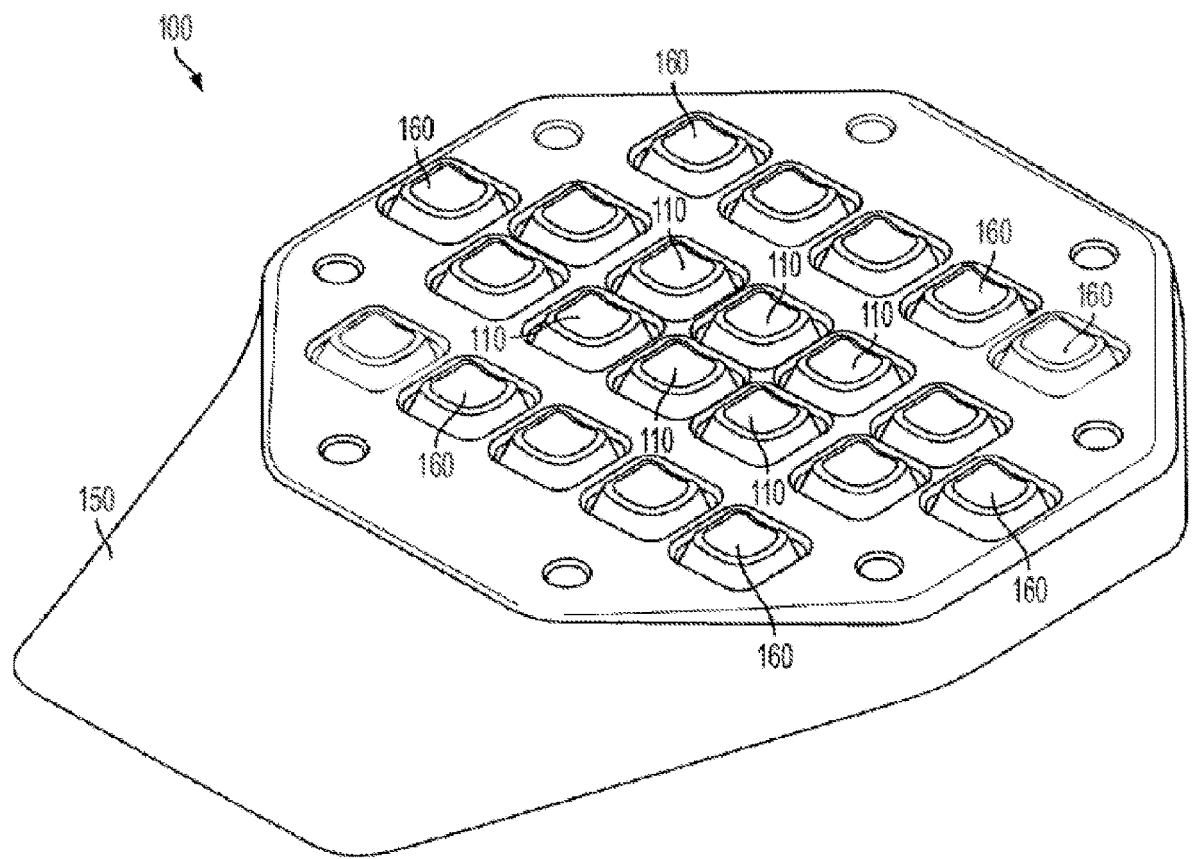
FIG. 5 is a perspective view of one illustrative embodiment of an input device including a number of force sensitive input keys and a number of binary input keys.
Figure 6:
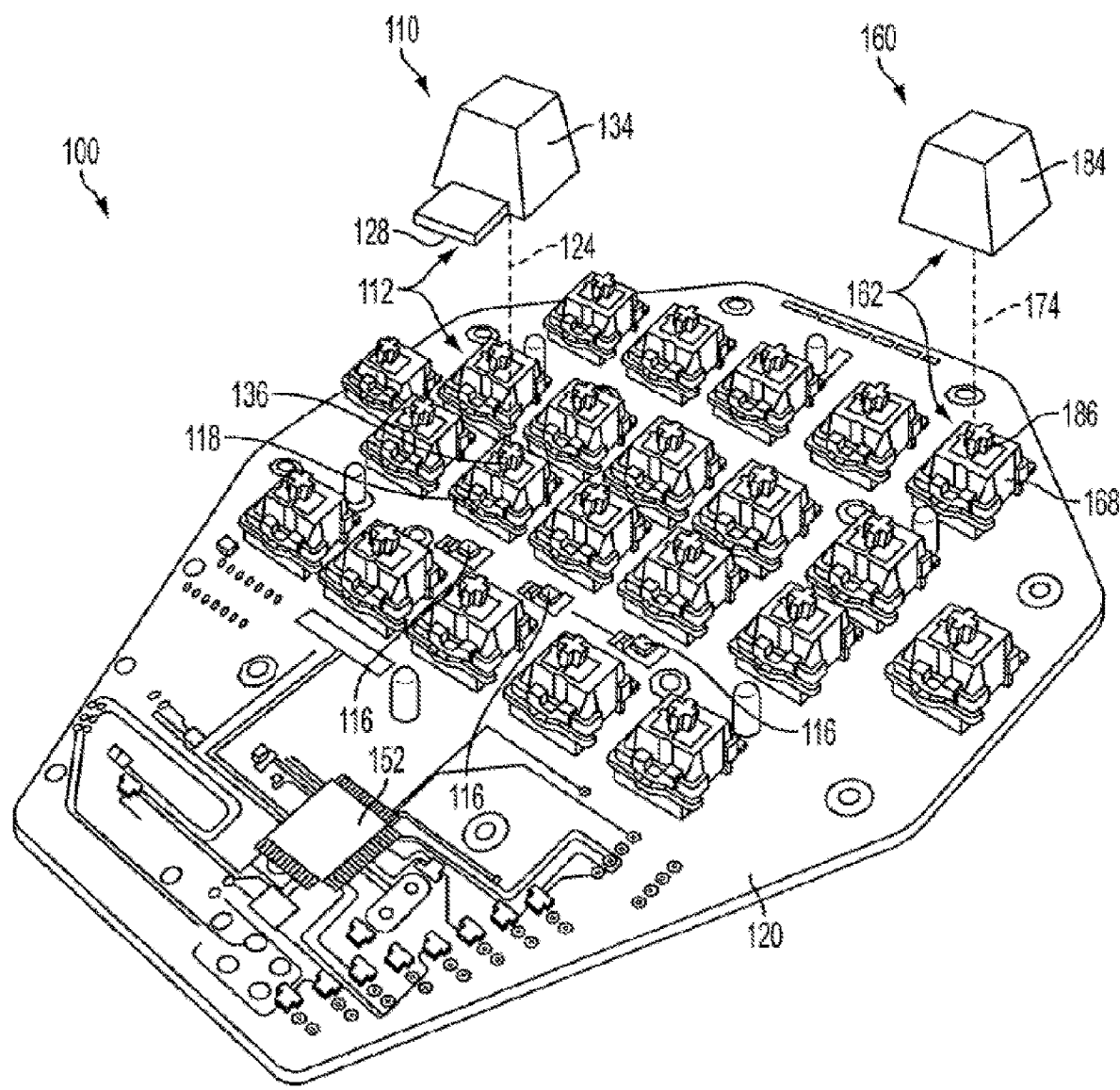
FIG. 6 is a partially-exploded perspective view of several components of the input device of FIG. 5.

Referring now to FIGS. 5 and 6, one illustrative embodiment of an input device 100 is shown as a gaming controller, or game pad, 100. While the present disclosure generally describes applications involving electronic games (e.g., computer games), it will be appreciated that one or more features of the input device 100 may advantageously be incorporated into input keys for many applications in the fields of consumer, industrial, medical, and other electronics. It is contemplated that input keys similar to those described herein may be useful in translating user intent to a form interpretable by any type of computing device, including, but not limited to, personal computers, entertainment systems, industrial computing systems, stenography devices, medical computing systems, and other computing devices. By way of example, when an input key according to the present disclosure is used in a medical application (specifically, radiology), the force applied by a user to a force sensitive input key of the input key may control how fast a computerized tomography system changes between the displayed slices.

As shown in FIG. 5, the game pad 100 includes a number of force sensitive input keys 110 and a number of binary input keys 160. In particular, the illustrative embodiment of the game pad 100 includes six force sensitive input keys 110 that are arranged near the center of the game pad 100 and sixteen binary input keys 160 that surround the force sensitive input keys 110 (not all binary input keys 160 are labeled in FIG. 2). It is contemplated that, in other embodiments, the game pad 100 may include any number of force sensitive input keys 110 and any number of binary input keys 160 (including no binary input keys 160). As described below, an arrangement of at least four force sensitive input keys 110 may be advantageous for certain applications. Such an application may include an electronic computer game in which the corresponding W, S, A, and D keys on a traditional computer keyboard are configured as force sensitive input keys 110.

The game pad 100 also includes a cover 150 to protect the internal electronic components of the game pad 100. The game pad 100 is shown in FIG. 5 with the cover 150 removed to expose several internal components of the game pad 100. It is contemplated that, in other embodiments, the game pad 100 may contain additional or different components to those illustrated in FIGS. 5 and 6.

Except as noted below, each of the force sensitive input keys 110 of the game pad 100 has a similar configuration and operation to the force sensitive input key 10 described above (with reference to FIGS. 1-4). In the illustrative embodiment shown in FIGS. 5 and 6, the force sensitive input keys 110 (and the binary input keys 160) of the game pad 100 are each embodied in the form factor of a standard keyswitch. In particular, the button 112 of each force sensitive input key 110 has a two-part construction that includes a keycap 134 configured to be pressed by a user and a plunger 136 that engages a spring 114 within a housing 118. The housing 118, plunger 136, and spring 114 of each force sensitive input key 110 are illustratively embodied as an MX Series Desktop Profile 0.60 Inch Keyswitch (with linear actuation), commercially available from Cherry Corporation of Pleasant Prairie, Wis. The button 162 of each binary input key 160 has a similar two-part construction that includes a key cap 184 and a plunger 186 that engages a spring 164 within a housing 168. The housing 168, plunger 186, and spring 164 of each binary input key 160 are illustratively embodied as an MX Series Desktop Profile 0.60 Inch Keyswitch (with pressure point click), also commercially available from Cherry Corporation. The housing 118 of each force sensitive input key 110 and the housing 168 of each binary input key 160 are secured to a PCB 120.

The majority of the keycaps 134, 184 have been removed in FIG. 6 to expose the housings 118, 168 and the plungers 136, 186 of the input keys 110, 160. One keycap 134 and one keycap 184 are shown in the partially-exploded view of FIG. 6 to indicate their relationships to the plunger 136 and the plunger 186, respectively. When the keycap 134 is coupled to the plunger 136, the plunger 136 supports the keycap 134. When assembled, the keycap 134 and plunger 136 move together along an axis 124 as the button 112 of the force sensitive input key 110. Similarly, when the keycap 184 is coupled to the plunger 186, the plunger 186 supports the keycap 184. When assembled, the keycap 184 and plunger 186 move together along an axis 174 as the button 162 of the binary input key 160.

As shown in FIG. 6, for each of the force sensitive input keys 110, the analog sensor 116 is positioned outside the housing 118 (rather than within the housing, like the illustrative embodiment of the force sensitive input key 10 shown in FIG. 1). In particular, the analog sensor 116 of each of the force sensitive input keys 110 is soldered to the PCB 120 in a position adjacent the housing 118. In at least some embodiments, in particular those in which the analog sensor 116 includes a reflectance sensor, the keycap 134 of each of the force sensitive input keys 110 includes a reflective surface 128. As shown in FIG. 6, the reflective surface 128 extends outwardly from the keycap 134 above the analog sensor 116. In the illustrative embodiment, the reflective surface 128 is integrally formed with the keycap 134 (i.e., the reflective surface 128 is a surface of the keycap 134). In other embodiments, the reflective surface 128 may be coupled to the keycap 134 after the keycap 134 has been formed. As the button 112 (including the keycap 134) moves along the axis 124, the reflective surface 128 will move along an axis that is generally parallel to the axis 124. In the illustrative embodiment, the reflective surface 128 is generally perpendicular to the axis 124 (and the axis of its travel).

Like the force sensitive input key 10 described above, each of the force sensitive input keys 110 of the game pad 100 is configured to output an analog signal that is a function of the force applied to that input key 110 or the distance traveled by that input key 110. For example, in embodiments that include a reflectance sensor, the analog sensor 116 of each force sensitive input key 110 will generate an analog signal in response to the amount of reflected light measured. As described above, since the displacement of the button 112 (including the keycap 134 and its reflective surface 128) is proportional to the force applied to the keycap 134 and the amount of light reflected from the reflective surface 128 is monotonically related to the displacement of the button 112, the amount of the light that is reflected from the reflective surface 128 is also monotonically related to the force applied to the keycap 134. As such, by measuring the amount of light that is reflected from the reflective surface 128, the analog sensor 116 is also able to indirectly measure the force applied by a user.

The analog signal output by each of the force sensitive input keys 110 of the game pad 100 is transmitted to a circuitry 152 that is configured to generate both analog input data and digital input data representative of the distance traveled by each button 112 of the input keys 110. The circuitry 152 is also configured to determine a force applied to each of the force sensitive input keys 110 based on the respective analog signal. In the illustrative embodiment, the circuitry 152 of the game pad 100 is soldered to the PCB 120. In other embodiments, the circuitry 152 may be external to the game pad 100. The circuitry 152 is illustratively embodied as an ATmega16U4 8-Bit AVR Microcontroller with 16K Bytes of ISP Flash and USB Controller, commercially available from Atmel Corporation of San Jose, Calif.

In some embodiments, the circuitry 152 may include an analog-to-digital converter (ADC) configured to convert the analog signals received from the force sensitive input keys 110 into digital signals. In other words, the ADC of the circuitry 152 is configured to output a digital signal based upon each analog signal received from the force sensitive input keys 110. It is contemplated that, in other embodiments, the ADC may be separate from the circuitry 152 (i.e., a separate component soldered to the PCB 120). In the illustrative embodiment, the game pad 100 also includes one or more low-pass filters soldered to a backside of the PCB 120 (not shown). These one or more low-pass filters are positioned between the force sensitive input keys 110 and the ADC of the circuitry 152 and are configured to reduce noise in one or more of the analog signals from the force sensitive input keys 110 before the analog signals are received by the ADC.

Once the analog signals from the force sensitive input keys 110 have been converted into digital signals, the circuitry 152 of the game pad 100 may determine a force applied to each of the force sensitive input keys 110 and/or a distance traveled by the button 112 and subsequently generate analog input data and digital input data. As described above, the magnitude of each analog signal represents the amount of the light measured by each force sensitive input key 110, which is monotonically related to the force applied to and/or the distance traveled by the keycap 134 of that input key 110. As such, the circuitry 152 may calculate the force applied and/or the distance traveled to one of the force sensitive input keys 110 using the value of the received analog signal (converted to a digital signal). The circuitry 152 may perform this calculation of the force applied using a mathematical function, a look-up table, or any other suitable calculation process. The circuitry 152 may then perform appropriate calibration, mapping, and/or scaling of the determined force and/or distance into a format suitable for presentation to a driver of a computing device connected to the game pad 100.

In the illustrative embodiment, the circuitry 152 is configured to output movement data including both direction and magnitude in response to analog signals received from four of the force sensitive input keys 110 of the game pad 100. In particular, two of the force sensitive input keys 110 may be used to register user intent regarding movement along an x-axis (one input key 110 representing positive movement along the x-axis and one input key 110 representing negative movement along the x-axis). Likewise, two of the force sensitive input keys 110 may be used to register user intent regarding movement along a y-axis (one input key 110 representing positive movement along the y-axis and one input key 110 representing negative movement along the y-axis). Using the analog signals output by these four force sensitive input keys 110, the circuitry 152 may generate movement data that includes an x-axis component and a y-axis component. When any one of the four force sensitive input keys 110 is pressed by a user, the circuitry 152 may calculate a vector in the corresponding direction, where a magnitude of the vector is proportional to the force applied to that input key 110 by the user. Where multiple (e.g., two) force sensitive input keys 110 are pressed simultaneously, the circuitry 152 may add the calculated vectors to determine the overall direction and magnitude of movement intended by the user. In an electronic gaming application (e.g., a computer game), this movement data may be used to accurately and precisely control the movement and/or actions of a character in the game.

In some embodiments, the circuitry 152 may format the determined movement data, the analog input data, and/or the digital input data for presentation to a driver of a computing device connected to the game pad 100. For instance, the movement data may be formatted according to a Universal Serial Bus (USB) protocol (e.g., by a USB controller included in the circuitry 152) where the game pad 100 is coupled to the computing device via a USB cable. In other embodiments, the circuitry 152 may format the movement data, the analog input data, and/or the digital input data according to the Direct Input protocol, the X-Input protocol, or any other protocol expected by a driver of a particular computing device. In some embodiments, the formatting performed by the circuitry 152 may be adjustable by a user. For instance, the user may set how different forces applied to one of the force sensitive input keys 110 of the game pad 100 are mapped to a 256-value scale. This configurability may allow more users (e.g., of different abilities) to effectively use the game pad 100. In some embodiments, the user may also be able set a threshold distance similar to the threshold distance 34 described above.

Although the embodiments described above include the circuitry 152 and circuitry 17 as a component of the gamepad 100 and input device 10, respectively, it is contemplated that other suitable methods may be used that receive the analog signal and in turn generate both analog and digital input data related to the displacement of the plunger 12, 134. For example, a software development kit (SDK), an application program interface (API), or the like may be used to generate the analog and digital input data in response to the analog signal. In one such embodiment, the circuitry 17 of the force sensitive input device 10 may communicate the current state of the force sensitive input device 10, in particular the position of the plunger 12, through a protocol, interface, or port. Then, that information is fed to a software application that will read in the analog state of each force sensitive input device 10 to be manipulated by that software application or passed onto another application where the analog state will be programmed to perform a function within that software application.

In at least some embodiments, a COM port may be opened up between the hardware of the force sensitive input device and the operating system. The analog state of each input device 10 will continuously be sent over this COM port where each input device 10 will be able to have a range of values. Depending on the desired scale and precision, the output may be in the range of 0-255, or 0-4096, or the output may be in the range of 0.000-1.000 and all the decimal points in between. For example, when the plunger 12 is not pressed, the associated value would be 0 or 0.000, and when the plunger 12 is pressed all the way down, the associated value may be 255, 4096, or 1.000. The plunger 12 being pressed halfway down would result in an associated value of 128, 2048 or 0.500.

Next, a software application (SDK/API) will be programmed to read the output data continuously and keep track of the state of all keys 10, 110, 160 of the device 10, 100 and establish a standardized format for the data so it can be presented to other software applications. For example, it might read a value of "0.250" for the "A" key on a standard keyboard and "0.125" for the "S" key on a standard keyboard. These values would then be stored in the SDK/API in a variable for example "analog_s=0.125" and "analog_a=0.250". The software application can then either pass this formatted data to other applications as is ("analog_s=0.125"), or it may perform internal calculations on the values and manipulate the data using the throttle or peak routines and assign specific values for that formatted data ("analog_s_throttle_rate=2" or "analog_s_peak=0.125). Such throttle and peak routines will be described in detail below.

These software applications would then be programmed to interact with this SDK/API and read in these standardized analog values. In at least one embodiment, if a program had a slider, the slider could be manipulated based off the state of the analog key. In such an embodiment, if the program reads in "analog_s=0.125", the software application would set the slider immediately to 12.5% of the way up. Alternatively, the software may read in the "analog_s_throttle_rate=2" and instead increase the slider value by 2% every second. As a further alternative, the software may take the "analog_s" value and do its own internal calculation and increase the current value of the slider at the rate of the "analog_s" value. In such a scenario, if the slider were currently at 10% and it received a value of "analog_s=0.125" then it may increase the slider value by 2% every second (10% to 12% to 14%, etc.). However, if it received a value of "analog_s=0.250" it might increase the slider by value of 4% every second (10% to 14% to 18%, etc.). Similar functions could be programmed at the SDK/API level or in the specific software application.

Figure 7:
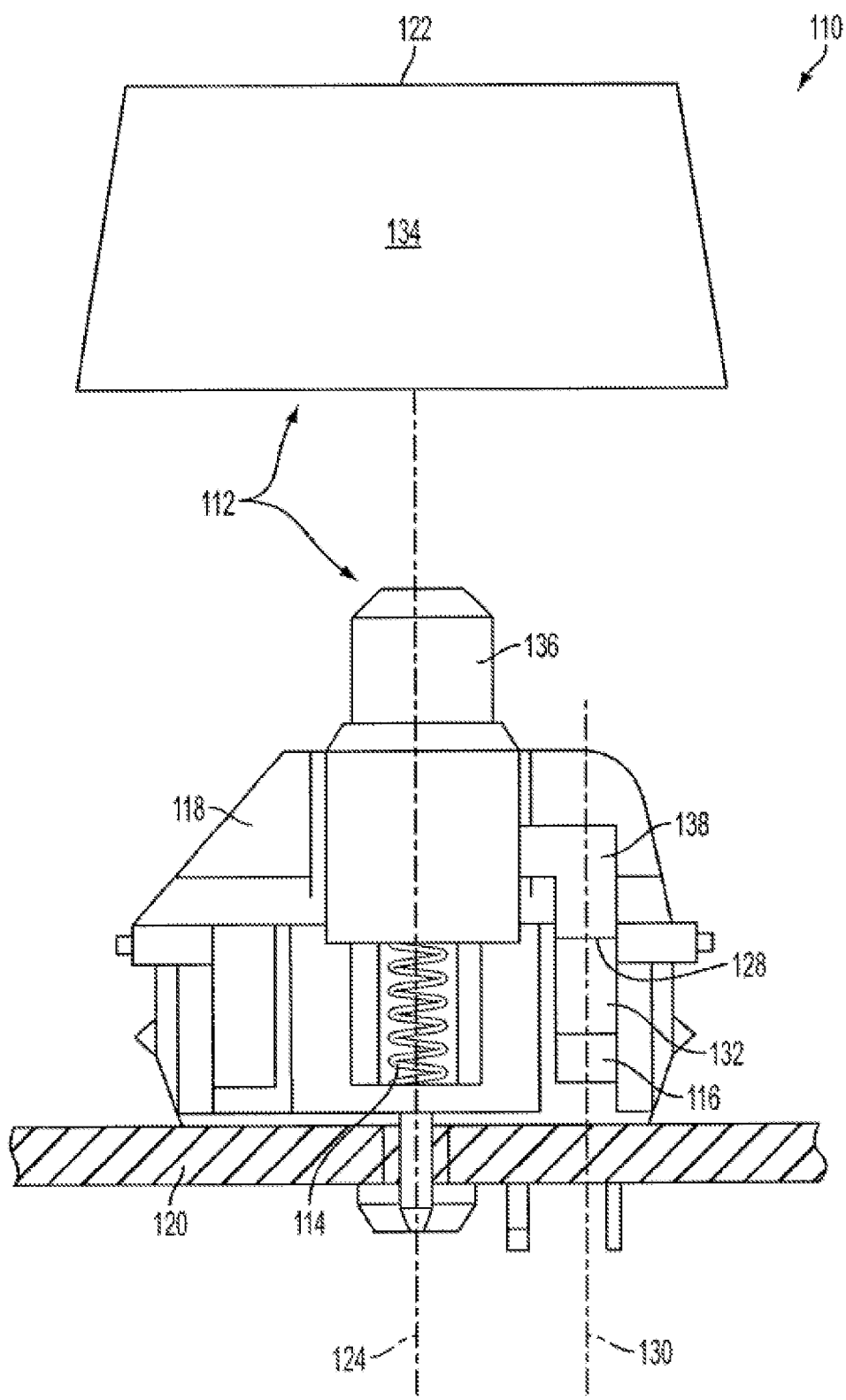
FIG. 7 is a cross-sectional view of another illustrative embodiment of a force sensitive input key that may be used in the input device of FIG. 5.

Referring now to FIG. 7, another illustrative embodiment of a force sensitive input key 110 that may be used in the game pad 100 (or other input devices 100) is shown in cross-section. The illustrative embodiment of the force sensitive input key 110 shown in FIG. 7 is similar in configuration and operation to the force sensitive input keys 110 shown in FIGS. 5 and 6, except that (like the force sensitive input key 10 of FIG. 1) the analog sensor 116 is disposed in a chamber 132 defined within the housing 118. As shown in FIG. 7, the button 112 of the force sensitive input key 110 has a two part construction that includes a keycap 134 (with a surface 122 configured to be pressed by a user) and a plunger 136 that engages a spring 114 within the housing 118. The plunger 136 is movable along an axis 124 when a force is applied to the keycap 134 by a user. The plunger 136 is illustrated in FIG. 7 in a top end position. When the surface 122 of the keycap 134 is pressed by a user, the keycap 134 and the plunger 136 may both move along the axis 124 (downward in FIG. 7) until the button 112 reaches a bottom end position.

In the illustrative embodiment of FIG. 7, the plunger 136 includes a plunger arm 138 that extends into the chamber 132 defined in the housing 118. The reflective surface 128 of the button 112 is included on the plunger arm 138 and faces the analog sensor 116. In some embodiments in which the analog sensor 116 includes a reflectance sensor, the reflective surface 128 is integrally formed with the plunger 136 (i.e., the reflective surface 128 is a surface of the plunger 136). In other embodiments, the plunger arm 138 and/or the reflective surface 128 may be coupled to the plunger 136 after the plunger 136 has been formed. As the button 112 (including the plunger 136) moves along the axis 124, the reflective surface 128 will move along an axis 130 that is generally parallel to the axis 124. In the illustrative embodiment, the reflective surface 128 is generally perpendicular to the axis 130 (as well as the axis 124). In the illustrative embodiment, the housing 118 may be formed of an opaque material, such that light is not able to escape and/or enter the chamber 132.

In some embodiments, the input devices may output a value that is representative of the "real-time" position of the cap 134 and plunger 12. For example, if a user presses the input device 10 down half way, the output value may be "50." But, when the user releases the input device 10, it returns to its original position, and the output value immediately changes to "0." This behavior can be problematic for particular applications (e.g., when setting a volume level on a computer) as it would require the user to hold the analog input key in a particular partially-depressed position indefinitely to achieve the desire value.

According to the present disclosure, the force sensitive input device 10, 100 may be configured such that it can control an increase or a decrease in a controlled value in relation to how far down the analog input device 10, 100 is pressed. For example, if the user were to press and hold the plunger 12, 134 down 10% of its maximum displacement, the controlled value would steadily increase at a particular rate, such as from 0 to 10 to 20 to 30, etc. If the user then released the plunger 12, 134, the controlled value would remain constant (until further user input). If the user desired to decrease the controlled value, a second force sensitive input device (i.e., another one of the buttons 112) could be use in a similar manner to control the decrease. For example, if the user were to press and hold the second force sensitive input device down 10% of its maximum displacement, the controlled value would steadily decrease at a particular rate, such as from 30 to 20 to 10 to 0. If the user wanted to more rapidly increase or decrease the controlled value, he or she could press the appropriate force sensitive input device further down further to increase or decrease the controlled value at a higher rate (e.g., 0 to 30 to 60 to 90, etc.).

In another embodiment, one force sensitive input device 10 can be used to set-and-hold a particular level for controlled value by monitoring the "peak" value during a depression of the input device 10. In this control method, the circuitry 17 associated with the input device 10 will increase the controlled value in proportion to the amount that the input device 10 is pressed down by a user, but will maintain and will not decrease the value as the input device 10 returns to its rest position. After the force sensitive input device 10 has been fully released, a user subsequently pressing down on the input device 10 and displacing it form its rest position may reset the controlled value to "0" (and may then begin increasing the controlled value in proportion to the amount that the input device 10 is pressed down by the user). Such a functionality may be useful in situations such as electronic computer games that involve a "throttle" such as flight simulators and automobile driving simulators.

Figure 8:
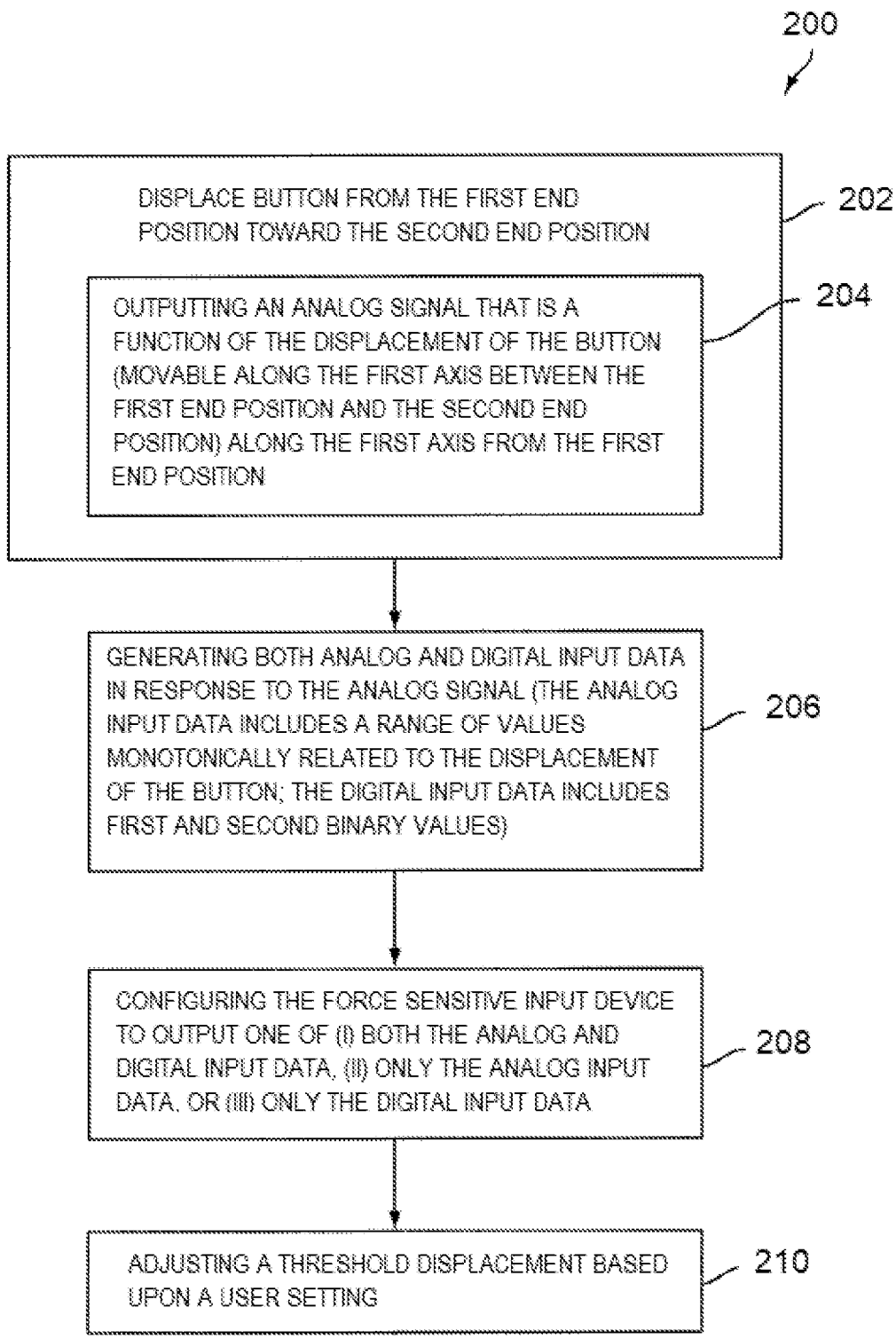
FIG. 8 is a simplified flow diagram showing one illustrative embodiment of a force sensitive input method.

Referring now to FIG. 8, one illustrative embodiment of a force sensitive input method 200 is shown as a simplified flow diagram. The method 200 may be used with the force sensitive input device 10 of FIGS. 1-4, with the force sensitive input keys 110 of FIGS. 5-7, and/or with any other suitable force sensitive input device(s). The method 200 begins with block 202 in which a plunger 12 that is movable along an axis 24 between two end positions is displaced toward one of the two end positions against the force of a resilient component 14. As described above, the plunger 12 may be biased toward one of the two end positions using a spring 14. While the spring 14 allows displacement of the plunger 12 along the axis 24 (as described below), the spring 14 continually biases the plunger 12 toward one of the two end positions. In some embodiments, block 202 may involve a user applying a force to the plunger 12 to cause movement of the plunger 12 along the axis 24.

The method 200 continues with block 204 which occurs during block 202. Block 204 may involve outputting an analog signal that is a function of a displacement of the plunger 12 along the first axis 24 from the first end position. In at least some embodiments, the outputting may be executed by an analog sensor 16. In this embodiment, a reflective surface 28 of the plunger 12 may be illuminated with light that travels generally parallel to the axis 24. In an embodiment in which the analog sensor 16 is a reflectance sensor, block 204 may include illuminating the reflective surface 28 of the plunger 12 by emitting light from an LED of the sensor 16 that faces the reflective surface 28. In particular, block 202 may involve emitting infrared light from the LED of the sensor 16. It is contemplated that, in other embodiments, other types of light sources and/or other types of light may be used to illuminate the reflective surface 28 of the plunger 12. The block 204 may be performed either continuously or intermittently throughout the method 200. It is also contemplated that other types of sensors may be used as the analog sensor 16 which involve other suitable methods of outputting an analog signal that is a function of the displacement of the plunger 12.

During block 204 an amount of the light that is reflected from the reflective surface 28 and that travels generally parallel to the axis 24 may be measured by the sensor 16. In some embodiments, block 204 may involve receiving and measuring the reflected light using a phototransistor of the sensor 16. The phototransistor of the sensor 16 may output an analog signal that is a function of the amount of the light that is reflected from the reflective surface 28. As described above, the amount of the light that is reflected from the reflective surface 28 (and, hence, the magnitude(s) of the generated analog signal) may be monotonically related to the force applied to and the distance traveled by the plunger 12.

After block 204, the method 200 continues to block 206 which may involve generating both analog and digital input data in response to the analog signal. The analog input data may include a range of values that are monotonically related to the displacement of the plunger 12. The digital input data may include first and second binary values. In some embodiments, block 206 may involve a circuitry 152 receiving the analog signal output by the phototransistor in block 204 and calculating the force applied to and the distance traveled by the plunger 12 using this analog signal, as described above. In such embodiments, block 206 may involve converting the analog signal output by the phototransistor into a digital signal using an ADC of the circuitry 152. In some embodiments, block 206 may also involve reducing noise in the analog signal using a low-pass filter, prior to the analog signal being converted by the ADC.

After block 206, the method 200 may continue to block 208 which may involve configuring the force sensitive input device 10, 100 to output one of (i) both the analog and digital input data, (ii) only the analog input data, or (iii) only the digital input data.

In the method 200, the first binary value may be representative of the displacement of the plunger 12 being less than a threshold displacement, the threshold displacement corresponding to a threshold position 34 located between the first and second end positions. The second binary value may be representative of the displacement of the plunger 12 being equal to or greater than the threshold displacement. In some embodiments, a minimum value of the analog input data may be representative of the plunger 12 being in the first end position and a maximum value of the analog input data may be representative of the plunger 12 being in the second end position. In at least one embodiment, a minimum value of the analog input data may be representative of the plunger 12 being in the first end position and a maximum value of the analog input data may be representative of the plunger 12 being in the threshold position 34. The threshold position 34 may be closer to the second end position than the first end position. After block 208, the method 200 may further comprise block 210 which may involve adjusting a threshold displacement 34 based on a user setting.

In some embodiments, the behavior of each input device 10 will vary from others as a result of the manufacturing tolerances of various components of the input devices 10, degradation of the analog sensor used to measure displacement of the plunger 12 over time, and even due to environmental factors. In particular, the minimum and maximum values of the analog sensor signal representing displacement of the plunger 12 will vary between input devices 10 and may fluctuate over time. As such, it is advantageous to periodically automatically calibrate each input device 10 and store the calibration information in a memory of the device (e.g., keyboard) including the input device(s) 10.

Figure 9:
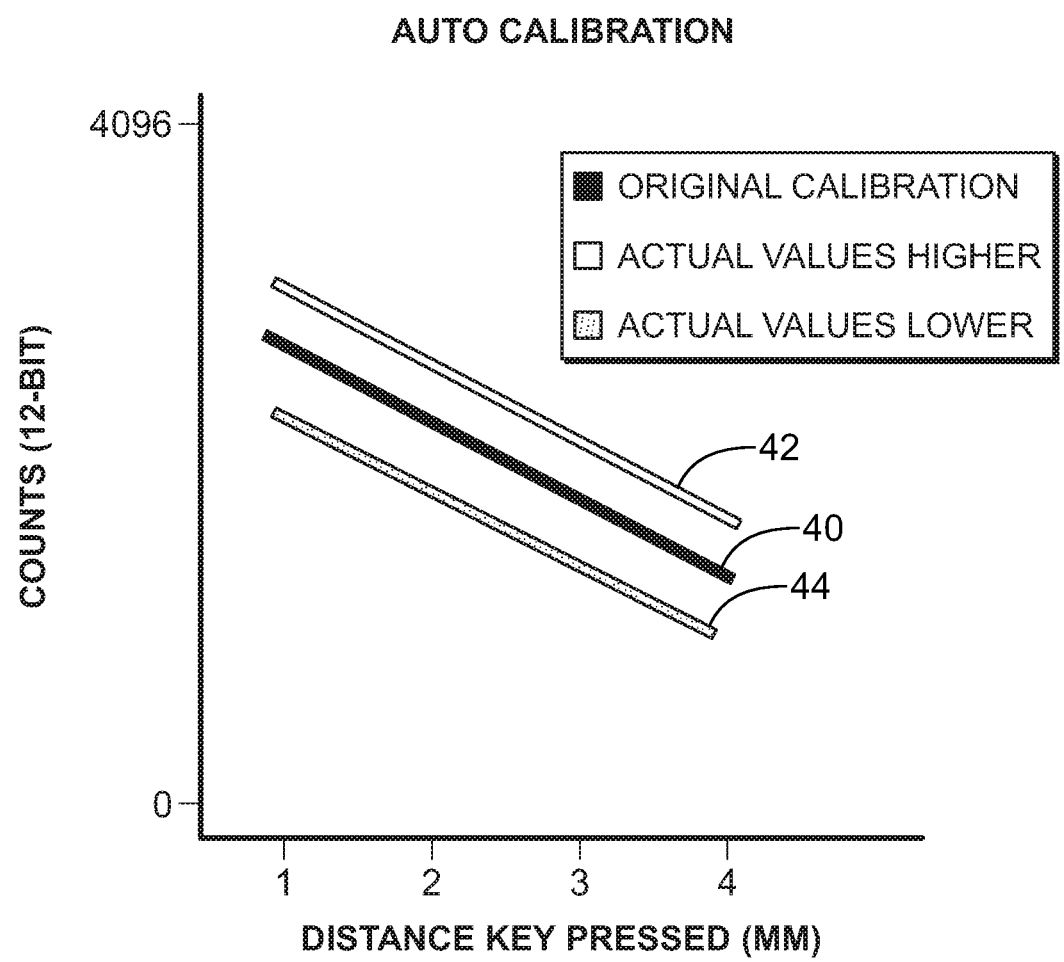
FIG. 9 is a simplified graph illustrating various calibration scenarios that can be automatically compensated by the presently disclosed devices and methods.

FIG. 9 illustrates three different calibration curves for a force sensitive input device 10. While the original calibration curve 40 may accurately represent the behavior of the input device 10 during an initial time period, the behavior of the input device 10 may change over time. In some circumstances, represented by calibration curve 42, the analog sensor signal may register higher values at particular displacements of the plunger 12 than those suggested by the original calibration curve 40. In other circumstances, represented by calibration curve 44, the analog sensor signal may register lower values at particular displacements of the plunger 12 than those suggested by the original calibration curve 40.

As can be observed in FIG. 9, this variation in the analog sensor signal over time leads to at least four possible scenarios that may be problematic for a user of the force sensitive input device 10. In the first scenario of the exemplary embodiment, the sensor signal value at the top of the key press may be higher than the calibrated value (left side of curve 42), requiring a user to depress the input device 10 further in order to get the expected response. In the second scenario, the sensor signal value at the top of the key press may be lower than calibrated (left side of curve 44), which may cause the input device 10 to indicate activation without the user depressing the input device 10. In the third scenario, the sensor signal value at the bottom of the key press may be higher than the calibrated value (right side of curve 42), preventing the user from utilizing the full range of the input device 10. In the fourth scenario, the sensor signal value at the bottom of the key press may be lower than calibrated (right side of curve 44), causing the user to reach the bottom of the input device 10 press early and lose sensitivity.

Periodically performing an automatic calibration of each input device 10 and storing the calibration information in a memory of the device (e.g., keyboard) including the input input devices 10 can help to prevent these scenarios. In some embodiments, the period calibration may be executed by the circuitry 17 associated with the force sensitive input device 10. The circuitry 17 is configured to generate input data in response to the analog signal using, for example, the stored calibration curves 40, 42, 44 discussed above. In such an embodiment, values of the analog signal are associated with positions of the button along the first axis. As will be described below, the circuitry 17 may be further configured to perform an automatic calibration procedure that comprises updating the stored calibration data with at least one sampled value of the analog signal.

It is contemplated that other circuitry, software, applications, and the like may perform the automatic calibration and generation of the input data based on the analog signal. For example, circuitry that is either internal or external to the force sensitive input device 10 (such as circuitry 152 discussed above) may be utilized to perform functions described herein. Moreover, it is contemplated that a driver of an operating system, a software development kit (SDK), an application program interface (API), or the like may be used to perform the functions described herein.

Advantageously, the automatic calibration procedure can utilize knowledge of whether a particular input device 10 is being depressed, or not, based upon a state of a mechanical switch in the input device 10. For instance, the MX Series Desktop Profile 0.60 Inch Keyswitch used in the illustrative embodiment will activate at roughly halfway through the keystroke (see FIG. 2). This mechanical information indicates whether the input device 10 is between 0-2 mm depressed or between 2-4 mm depressed and can be used in the automatic calibration procedure, as described below.

To address the first scenario above, if a value of the analog sensor signal is detected that is greater than the maximum value of the current calibration curve, that detected value maybe set as the new maximum possible value for the signal. In some embodiments, the circuitry 17 may update the stored calibration data by replacing the stored value associated with the second end position (i.e., calibration curve 40) with the sampled value (i.e., curve 42) when the sampled value of the analog signal is greater than the stored value associated with the second end position in the stored calibration data. Table 3 below contains one illustrative embodiment of code for achieving this functionality.

TABLE 3 if(adc_analog_raw[Analog_W] > (adc_analog_max[Analog_W] + adc_dzone_max[Analog_W])){adc_analog_max[Analog_W] = adc_analog_raw[Analog_W] − adc_dzone_max[Analog_W];}

To address the second scenario above, the value of the analog sensor signal may be repeatedly sampled during a calibration time period when the analog sensor signal is expected to be in the higher end of its range. Then, the highest value of the analog sensor signal detected during this calibration time period may be set as the new maximum possible value for the signal via the circuitry 17 or any suitable device. The calibration time period when the analog sensor signal is expected to be in the higher end of its range will correspond to either (i) the corresponding button being depressed and an associated mechanical switch being activated or (ii) the button not being depressed and the associated mechanical switch not being activated, depending on the type and configuration of the analog sensor (i.e., the analog sensor signal may take either its maximum or minimum value when the button is at rest, and take the opposite value when the button is fully depressed). Thus, in some embodiments, the calibration time period when the analog sensor signal is expected to be in the higher end of its range may correspond to a time period during which a mechanical switch associated with button corresponding to the analog sensor is activated; in other embodiments, this calibration time period may correspond to a time period when the associated mechanical switch is not activated. Table 4 below contains one illustrative embodiment of code for achieving the functionality just described.

TABLE 4

```
if (w_down == false)
    {
        if (adc_analog_raw[Analog_W] >
adc_analog_calc_max[Analog_W])
        {
            adc_analog_calc_max[Analog_W] =
adc_analog_raw[Analog_W];
        }
        w_up_cnt++;
        if (w_up_cnt > num_samples_top) // How many
samples are taken before deciding to replace the current
"min" value
        {
            adc_dzone_max[Analog_W] =
(adc_analog_max[Analog_W] −
adc_analog_min[Analog_W])*(.01*(adc_dzone_percentage/2));
            adc_analog_max[Analog_W] =
adc_analog_calc_max[Analog_W] − adc_dzone_max[Analog_W];
            adc_analog_calc_max[Analog_W] = 0;
            w_up_cnt = 0;
        }
    }
```

To address the second scenario above, the value of the analog sensor signal may be repeatedly sampled during a calibration time period when the analog sensor signal is expected to be in the lower end of its range. Then, the lowest value of the analog sensor signal detected during this calibration time period may be set as the new minimum possible value for the signal via the circuitry 17 or any suitable device. As discussed above, the calibration time period when the analog sensor signal is expected to be in the lower end of its range will correspond to either (i) the corresponding button being depressed and an associated mechanical switch being activated or (ii) the button not being depressed and the associated mechanical switch not being activated, depending on the type and configuration of the analog sensor (i.e., the analog sensor signal may take either its maximum or minimum value when the button is at rest, and take the opposite value when the button is fully depressed). Thus, in some embodiments, the calibration time period when the analog sensor signal is expected to be in the lower end of its range may correspond to a time period during which a mechanical switch associated with button corresponding to the analog sensor is activated; in other embodiments, this calibration time period may correspond to a time period when the associated mechanical switch is not activated. Table 5 below contains one illustrative embodiment of code for achieving the functionality just described.

TABLE 5

```
if((matrix_last[2][2]!=0) & (matrix_change[2][2]==0))
    {
        w_down = true;
        auto_cal_cnt = 0;
    }else
    {
        w_down = false;
    }
    if (w_down == true)
    {
        if (adc_analog_raw[Analog_W] <
adc_analog_calc_min[Analog_W])
        {
            adc_analog_calc_min[Analog_W] =
adc_analog_raw[Analog_W];
        }
        w_down_cnt++;
        if (w_down_cnt > num_samples_bot)
        {
```

TABLE 5-continued

```
            adc_analog_min[Analog_W] =
adc_analog_calc_min[Analog_W] + adc_dzone_min[Analog_W];;
            adc_analog_calc_min[Analog_W] = 4096;
            w_down_cnt = 0;
        }
    }
```

To address the fourth scenario above, if a value of the analog sensor signal is detected that is less than the minimum value of the current calibration curve, that detected value maybe set as the new minimum possible value for the signal. In some embodiments, the circuitry 17 may update the stored calibration data by replacing the stored value associated with the first end position (i.e., calibration curve 40) with the sampled value (i.e., curve 44) when a sampled value of the analog signal is less than a stored value associated with the first end position in the stored calibration data. Table 6 below contains one illustrative embodiment of code for achieving this functionality.

TABLE 6

```
if((adc_analog_raw[Analog_W] + adc_dzone_min[Analog_W]) <
    adc_analog_min[Analog_W]){adc_analog_min[Analog_W] =
    adc_analog_raw[Analog_W] + adc_dzone_min[Analog_W];}
```

Figure 10:
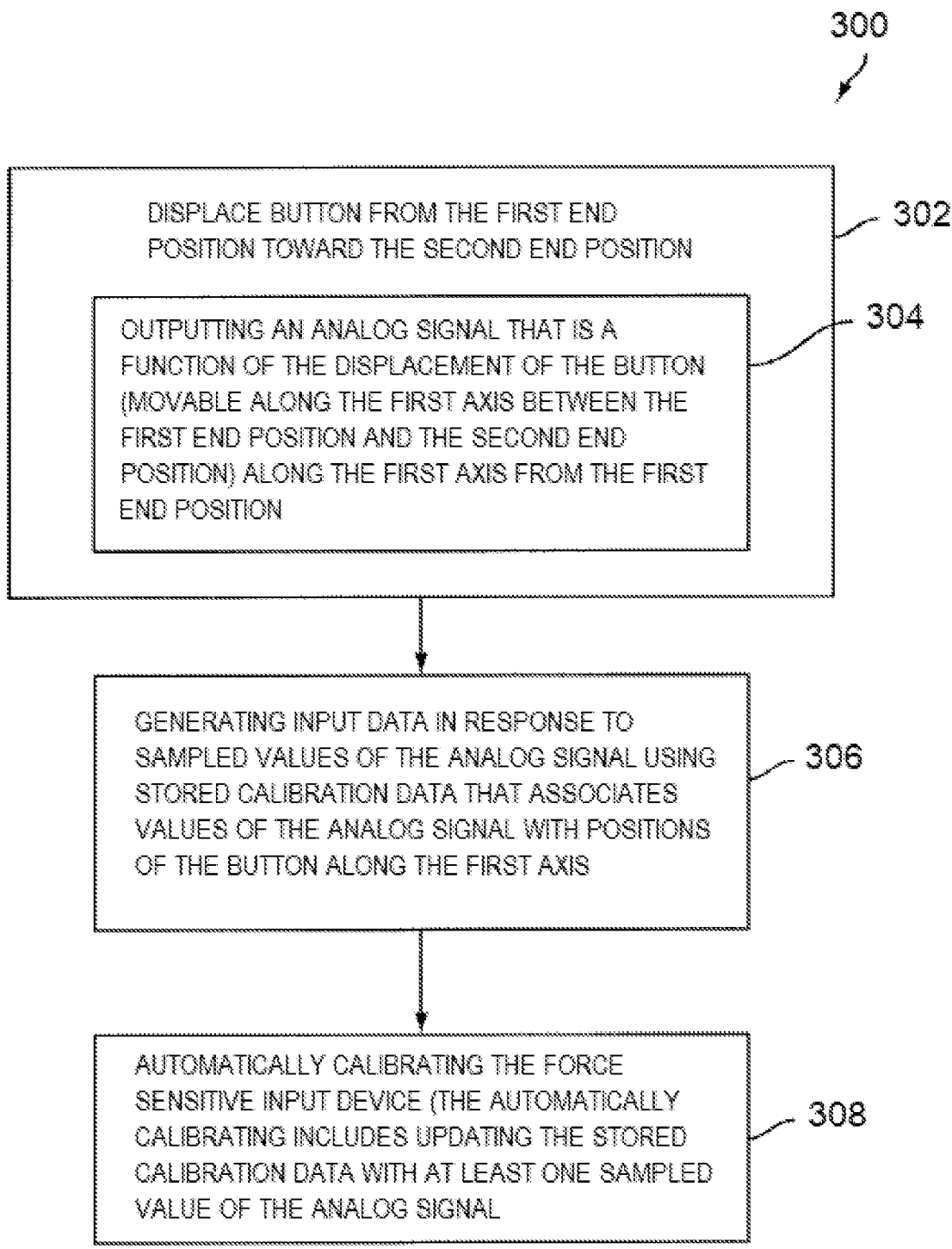
FIG. 10 is a simplified flow diagram showing another illustrative embodiment of a force sensitive input method.

Referring now to FIG. 10, one illustrative embodiment of a force sensitive input method 300 is shown as a simplified flow diagram. The method 300 may involve calibrating the force sensitive input device 10 of FIGS. 1-4, the force sensitive input keys 110 of FIGS. 5-7, and/or any other suitable force sensitive input device(s). The method 300 begins with block 302 in which a plunger 12 that is movable along an axis 24 between two end positions is displaced toward one of the two end positions against the force of a resilient component 14. As described above, the plunger 12 may be biased toward one of the two end positions using a spring 14. While the spring 14 allows displacement of the plunger 12 along the axis 24 (as described below), the spring 14 continually biases the plunger 12 toward one of the two end positions. In some embodiments, block 302 may involve a user applying a force to the plunger 12 to cause movement of the plunger 12 along the axis 24.

The method 300 continues with block 304 which occurs during block 302. Block 304 may involve outputting an analog signal that is a function of a displacement of the plunger 12 along the first axis 24 from the first end position. In at least some embodiments, the outputting may be executed by an analog sensor 16, as described above. It is contemplated that in at least one embodiment, a reflectance sensor, as discussed above, may be used as the analog sensor 16. However, other types of sensors may be used as the analog sensor 16 which involve other suitable methods of outputting an analog signal that is a function of the displacement of the plunger 12.

After block 304, the method 300 continues to block 306 which may involve generating input data in response to sampled values of the analog signal using stored calibration data that associates values of the analog signal with positions of the plunger 12 along the first axis. In at least some embodiments, as discussed above, the stored calibration data may include three different calibration curves for a force sensitive input device 10. While the original calibration curve 40 may accurately represent the behavior of the input device 10 during an initial time period, the behavior of the input device 10 may change over time. In some circumstances, represented by calibration curve 42, the analog sensor signal may register higher values at particular displacements of the plunger 12 than those suggested by the original calibration curve 40. In other circumstances, represented by calibration curve 44, the analog sensor signal may register lower values at particular displacements of the plunger 12 than those suggested by the original calibration curve 40.

After block 306, the method 300 may continue to block 308 which may involve automatically calibrating the force sensitive input device 10, the automatically calibrating including updating the stored calibration data with at least one sampled value of the analog signal.

In at least some embodiments, when a sampled value of the analog signal is greater than a stored value associated with the second end position in the stored calibration data, the automatically calibrating may further include updating the stored calibration data by replacing the stored value associated with the second end position with the sampled value. In some embodiments, when a sampled value of the analog signal is less than a stored value associated with the first end position in the stored calibration data, the automatically calibrating may further include updating the stored calibration data by replacing the stored value associated with the first end position with the sampled value. In at least some embodiments, the automatically calibrating may further include repeatedly sampling the analog signal during a calibration time period during which a mechanical switch of the button is activated and updating the stored calibration data by replacing a stored value associated with the second end position in the stored calibration data with a highest value of the analog signal sampled during the calibration time period. In some embodiments, the automatically calibrating may further include repeatedly sampling the analog signal during a calibration time period during which a mechanical switch of the button is not activated and updating the stored calibration data by replacing a stored value associated with the first end position in the stored calibration data with a lowest value of the analog signal sampled during the calibration time period.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present invention and fall within the spirit and scope of the present disclosure as defined by the appended claims.

The invention claimed is:

1. A force sensitive input device comprising:
a button movable along a first axis between first and second end positions and biased toward the first end position;
an analog sensor configured to output an analog signal that is a function of a displacement of the button along the first axis from the first end position; and
circuitry configured to generate both analog and digital input data in response to the analog signal, wherein the analog input data includes a range of values that are monotonically related to the displacement of the button, and wherein the digital input data includes first and second binary values.

2. The force sensitive input device of claim 1, wherein the circuitry is configurable to output both the analog and digital input data, only the analog input data, or only the digital input data.

3. The force sensitive input device of claim 1, wherein:
the first binary value is representative of the displacement of the button being less than a threshold displacement, the threshold displacement corresponding to a threshold position located between the first and second end positions; and
the second binary value is representative of the displacement of the button being equal to or greater than the threshold displacement.

4. The force sensitive input device of claim 3, wherein:
a minimum value of the analog input data is representative of the button being in the first end position; and
a maximum value of the analog input data is representative of the button being in the second end position.

5. The force sensitive input device of claim 3, wherein:
a minimum value of the analog input data is representative of the button being in the first end position; and
a maximum value of the analog input data is representative of the button being in the threshold position.

6. The force sensitive input device of claim 3, wherein the threshold displacement is reconfigurable to any selected displacement of the button.

7. The force sensitive input device of claim 3, wherein the threshold position is closer to the second end position than the first end position.

8. A method of using a force sensitive input device comprising a button movable along a first axis between first and second end positions and biased toward the first end position, the method comprising:
outputting, using an analog sensor, an analog signal that is a function of a displacement of the button along the first axis from the first end position; and
generating both analog and digital input data in response to the analog signal, wherein the analog input data includes a range of values that are monotonically related to the displacement of the button, and wherein the digital input data includes first and second binary values.

9. The method of claim 8, further comprising configuring the force sensitive input device to output one of (i) both the analog and digital input data, (ii) only the analog input data, or (iii) only the digital input data.

10. The method of claim 8, wherein:
the first binary value is representative of the displacement of the button being less than a threshold displacement, the threshold displacement corresponding to a threshold position located between the first and second end positions; and
the second binary value is representative of the displacement of the button being equal to or greater than the threshold displacement.

11. The method of claim 10, wherein:
a minimum value of the analog input data is representative of the button being in the first end position; and
a maximum value of the analog input data is representative of the button being in the second end position.

12. The method of claim 10, wherein:
a minimum value of the analog input data is representative of the button being in the first end position; and
a maximum value of the analog input data is representative of the button being in the threshold position.

13. The method of claim 10, wherein the threshold position is closer to the second end position than the first end position.

14. The method of claim 10, further comprising adjusting the threshold displacement based upon a user setting.

15. A force sensitive input device comprising:
a button movable along a first axis between first and second end positions and biased toward the first end position;
an analog sensor configured to output an analog signal that is a function of a displacement of the button along the first axis from the first end position; and
circuitry configured to generate input data in response to the analog signal using stored calibration data that associates values of the analog signal with positions of the button along the first axis, wherein the circuitry is further configured to periodically perform an automatic calibration procedure that comprises updating the stored calibration data with at least one sampled value of the analog signal.

16. The force sensitive input device of claim 15, wherein the automatic calibration procedure comprises, when a sampled value of the analog signal is greater than a stored value associated with the second end position in the stored calibration data, updating the stored calibration data by replacing the stored value associated with the second end position with the sampled value.

17. The force sensitive input device of claim 15, wherein the automatic calibration procedure comprises, when a sampled value of the analog signal is less than a stored value associated with the first end position in the stored calibration data, updating the stored calibration data by replacing the stored value associated with the first end position with the sampled value.

18. The force sensitive input device of claim 15, wherein the automatic calibration procedure comprises:
repeatedly sampling the analog signal during a first calibration time period; and
updating the stored calibration data by replacing a stored value associated with the second end position in the stored calibration data with a highest value of the analog signal sampled during the first calibration time period.

19. The force sensitive input device of claim 18, wherein the automatic calibration procedure comprises:
repeatedly sampling the analog signal during a second calibration time period; and
updating the stored calibration data by replacing a stored value associated with the first end position in the stored calibration data with a lowest value of the analog signal sampled during the second calibration time period.

20. The force sensitive input device of claim 19, wherein the first calibration time period is a time period during which the button is determined to be not activated, and wherein the second calibration time period is a time period during which the button is determined to be activated.

21. The force sensitive input device of claim 20, wherein the button is determined to be activated or not activated based on a state of a mechanical switch of the button.

22. The force sensitive input device of claim 19, wherein the first calibration time period is a time period during which the button is determined to be activated, and wherein the second calibration time period is a time period during which the button is determined to be not activated.

23. The force sensitive input device of claim 22, wherein the button is determined to be activated or not activated based on a state of a mechanical switch of the button.

24. A method of using a force sensitive input device comprising a button movable along a first axis between first and second end positions and biased toward the first end position, the method comprising:
outputting, using an analog sensor, an analog signal that is a function of a displacement of the button along the first axis from the first end position;
generating input data in response to sampled values of the analog signal using stored calibration data that associates values of the analog signal with positions of the button along the first axis; and
automatically calibrating the force sensitive input device periodically, wherein automatically calibrating comprises updating the stored calibration data with at least one sampled value of the analog signal.

25. The method of claim 24, wherein automatically calibrating comprises, when a sampled value of the analog signal is greater than a stored value associated with the second end position in the stored calibration data, updating the stored calibration data by replacing the stored value associated with the second end position with the sampled value.

26. The method of claim 24, wherein automatically calibrating comprises, when a sampled value of the analog signal is less than a stored value associated with the first end position in the stored calibration data, updating the stored calibration data by replacing the stored value associated with the first end position with the sampled value.

27. The method of claim 24, wherein automatically calibrating comprises:
repeatedly sampling the analog signal during a first calibration time period; and
updating the stored calibration data by replacing a stored value associated with the second end position in the stored calibration data with a highest value of the analog signal sampled during the first calibration time period.

28. The method of claim 27, wherein automatically calibrating comprises:
repeatedly sampling the analog signal during a second calibration time period; and
updating the stored calibration data by replacing a stored value associated with the first end position in the stored calibration data with a lowest value of the analog signal sampled during the second calibration time period.

29. The method of claim 28, wherein the first calibration time period is a time period during which the button is determined to be not activated, and wherein the second calibration time period is a time period during which the button is determined to be activated.

30. The method of claim 29, wherein the button is determined to be activated or not activated based on a state of a mechanical switch of the button.

31. The method of claim 28, wherein the first calibration time period is a time period during which the button is determined to be activated, and wherein the second calibration time period is a time period during which the button is determined to be not activated.

32. The method of claim 31, wherein the button is determined to be activated or not activated based on a state of a mechanical switch of the button.

* * * * *